(12) United States Patent
Gao

(10) Patent No.: US 8,899,489 B2
(45) Date of Patent: *Dec. 2, 2014

(54) RESONANT CIRCUIT STRUCTURE AND RF TAG HAVING SAME

(71) Applicant: Neoid Limited, Shenzhen, Guangdong (CN)

(72) Inventor: Bo Gao, Hong Kong (HK)

(73) Assignee: Neoid Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,404

(22) Filed: Apr. 16, 2013

(65) Prior Publication Data

US 2013/0228626 A1 Sep. 5, 2013

Related U.S. Application Data

(63) Continuation of application No. 13/008,030, filed on Jan. 18, 2011, now Pat. No. 8,439,272.

(60) Provisional application No. 61/456,837, filed on Nov. 15, 2010.

(51) Int. Cl.
*G06K 19/06* (2006.01)
*G06K 19/077* (2006.01)

(52) U.S. Cl.
CPC .... *G06K 19/07749* (2013.01); *G06K 19/07773* (2013.01); *G06K 19/07771* (2013.01); *G06K 19/07722* (2013.01)
USPC .......................................... 235/492; 235/451

(58) Field of Classification Search
USPC .................... 235/492, 451; 340/572.7, 572.8; 343/746
See application file for complete search history.

(56) References Cited

U.S. PATENT DOCUMENTS

| | | | |
|---|---|---|---|
| 6,720,930 B2 * | 4/2004 | Johnson et al. | 343/742 |
| 8,439,272 B2 * | 5/2013 | Gao | 235/492 |
| 2006/0043198 A1 * | 3/2006 | Forster | 235/492 |

* cited by examiner

*Primary Examiner* — Ahshik Kim

(57) ABSTRACT

A RF tag includes a resonant circuit structure and a RF device. The resonant circuit structure includes a first conducting layer; a second conducting layer spaced apart from the first conducting layer; and two conducting base portions respectively connecting two ends of the first conducting layers and two ends of the second conducting layers. A slit is formed on the first conducting layer and the RF device is electrically coupled to the first conducting layer and disposed over the slit.

20 Claims, 31 Drawing Sheets

US 8,899,489 B2

RESONANT CIRCUIT STRUCTURE AND RF TAG HAVING SAME

CROSS-REFERENCE TO RELATED APPLICATIONS

This application is a continuation-in-part of U.S. patent application Ser. No. 13/008,030, filed on Jan. 18, 2011, which claims the benefit of U.S. Provisional Application No. 61/456,837, filed on Nov. 15, 2010; the contents of which is hereby incorporated by reference.

FIELD OF THE PATENT APPLICATION

The present patent application relates to RF (radio frequency) tags and more particularly to a resonant circuit structure and a RF tag having the same that is capable of operating on metallic surfaces or embedded in metallic surfaces.

BACKGROUND

Electronic devices which can transmit a modulated electromagnetic signal that can be detected by a corresponding reader are widely used for identification and tracking of items, particularly for supply chain management, or item level product tracking Such devices, which will be referred to as RF tags, include RF device electrically connected to an antenna that is tuned to a particular frequency of operation, such as UHF (Ultra High Frequency) RFID (Radio Frequency Identification) tags, and Microwave RFID (Radio Frequency Identification) tags. The tags may be passive tags, which interact with reader by signal backscattering, semi-passive tags, which are powered by either their own power sources or external electromagnetic waves, or active tags, which are powered by its own power sources.

One disadvantage of these RF tags is that the reading range is reduced significantly when these tags are directly placed on a metallic surface. In a common case, the tags cannot be read. When the tags are placed close to the metallic surface at a distance less than $\lambda/4$, $\lambda$ being the wavelength at the frequency of operation of the RF tags, the RF tags' reading range will also be reduced. When RF tags placed near or directly on a metallic surface, the surface current on the metallic surface will degrade the efficiency of RF tags. Therefore, the tracking of metallic objects is very difficult for UHF RF tags and Microwave RF tags, and more typically, passive RF tags.

Another disadvantage of these RF tags is that the RF tags are commonly designed for tracking RF friendly materials, such as paper, and low permittivity plastics. When these tags are placed on RF un-friendly materials, such as high permittivity materials, magnetic materials, and liquid, the reading range will also be reduced, more typically to an unacceptable level.

SUMMARY

The present patent application is directed to a resonant circuit structure and a RF tag having the same. In one aspect, the RF tag includes a resonant circuit structure and a RF device. The resonant circuit structure includes a first conducting layer; a second conducting layer spaced apart from the first conducting layer; and two conducting base portions respectively connecting two ends of the first conducting layers and two ends of the second conducting layers. A slit is formed on the first conducting layer and the RF device is electrically coupled to the first conducting layer and disposed over the slit.

The first conducting layer may be parallel with the second conducting layer. The RF tag may further include a layer of dielectric material disposed between the first conducting layer and the second conducting layer.

The RF device may include a UHF RFID chip. The UHF RFID chip may include two signal outputs. The RF device may be directly electrically connected with the first conducting layer. The RF tag may further include a third conducting layer disposed on and capacitively coupled with the first conducting layer. The third conducting layer is electrically connected to the RF device. The third conducting layer may be made of substantially the same size as the first conducting layer. The third conducting layer may include an antenna for the RF device. The third conducting layer may be divided by at least a slit into a plurality of islands spaced apart from each other and the RF device may be disposed over the at least a slit. The at least a slit on the third conducting layer may be of the same size as the slit on the first conducting layer. The third conducting layer may include a plurality of conductive pads, the conductive pads being electrically connected with the RF device and capacitively coupled with the first conducting layer.

The impedance of the resonant circuit structure may be in conjugate match with the impedance of the RF device. At least an additional slit is formed on the first conducting layer and configured for transmitting electromagnetic waves with a polarization different from the electromagnetic waves transmitted through the other slit. The RF tag may further include at least an additional RF device. The at least one addition RF device may be disposed over the at least one additional slit.

The RF tag may further include an internal conducting layer disposed between the first conducting layer and the second conducting layer. The internal conducting layer may be electrically connected with the second conducting layer by a plurality of conducting portions. A slit may be formed on the internal conducting layer. The RF tag may further include more than one internal conducting layer disposed between the first conducting layer and the second conducting layer.

The two conducting base portions may be parallel with each other. The slit may be parallel with the conducting base portions. The RF tag may further include a discrete component connected to the first conducting layer. The discrete component may be a capacitor or an inductor.

The RF tag may further include a metallic housing. The metallic housing may include a plurality of protuberances and the protuberances may be aligned at a direction different from the RF tag's polarization direction. An intrinsic inductor or an intrinsic capacitor may be formed on the first conducting layer.

The longest dimensions of the first conducting layer and the second conducting layer may be smaller than the longest dimensions of the conducting base portions. The first conducting layer may be divided by the slit into at least two islands spaced apart from each other. The RF tag may further include a layer of magnetic material disposed between the first conducting layer and the second conducting layer.

In another aspect, the present patent application provides a resonant circuit structure for transmitting electromagnetic waves to a RF device. The resonant circuit structure includes: a first conducting layer; a second conducting layer spaced apart from the first conducting layer; and two conducting base portions respectively connecting two ends of the first conducting layers and two ends of the second conducting layers. A slit is formed on the first conducting layer and configured to support the RF device. The first conducting layer is configured to electrically couple the RF device.

BRIEF DESCRIPTIONS OF THE DRAWINGS

DETAILED DESCRIPTION

Reference will now be made in detail to a preferred embodiment of the resonant circuit structure and the RF tag having the same disclosed in the present patent application, examples of which are also provided in the following description. Exemplary embodiments of the resonant circuit structure and the RF tag having the same disclosed in the present patent application are described in detail, although it will be apparent to those skilled in the relevant art that some features that are not particularly important to an understanding of the resonant circuit structure and the RF tag having the same may not be shown for the sake of clarity.

Furthermore, it should be understood that the resonant circuit structure and the RF tag having the same disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
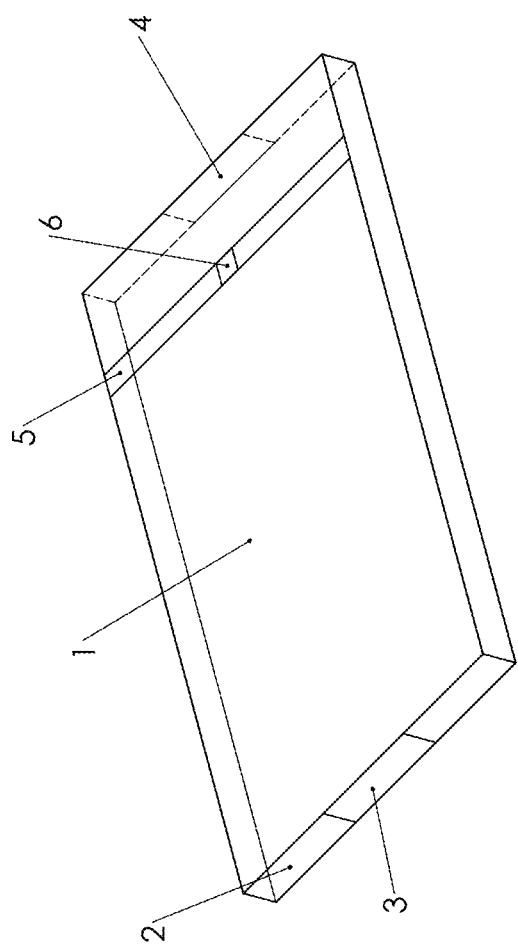
FIG. 1 shows a perspective view of a RF tag according to an embodiment of the present patent application.

FIG. 1 shows a perspective view of a RF tag according to an embodiment of the present patent application. Referring to FIG. 1, the RF tag includes a resonant circuit structure that includes a layer of metal forming a first conducting layer 1 and a second conducting layer 2 spaced apart from the first conducting layer 1. These two layers are in parallel and connected by two conducting base portions 3, 4. There may be a layer of dielectric material inserted between the first conducting layer 1 and the second conducting layer 2, which may be air, or more than one layer of dielectric material. There may also be one or multiple layers of magnetic material inserted between the first conducting layer 1 and the second conducting layer 2, which may be ferrite. A slit 5 is formed on the first conducting layer 1, which divides the first conducting layer 1 into two islands spaced apart from each other. The RF tag further includes a RF device 6. The RF device 6 may be electrically connected to the first conducting layer 1 and disposed over the slit 5.

Figure 2:
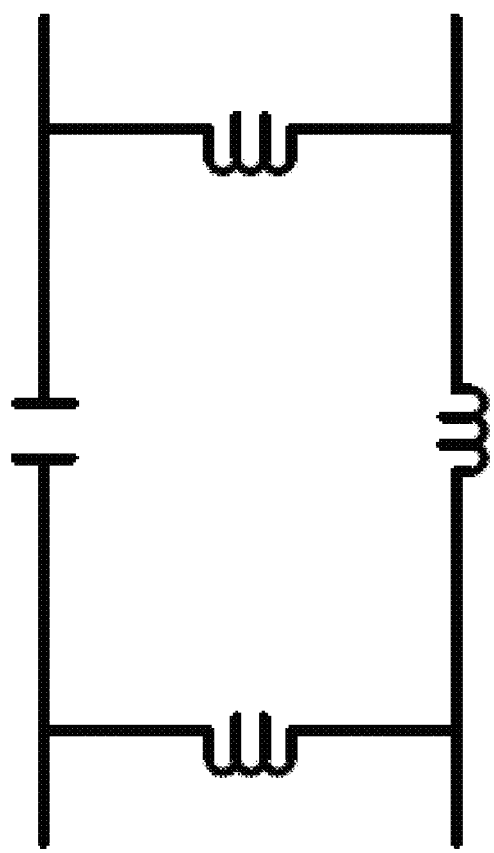
FIG. 2 is an equivalent schematic circuit diagram of the resonant circuit structure shown in FIG. 1.

FIG. 2 is an equivalent schematic circuit diagram of the resonant circuit structure shown in FIG. 1. Referring to FIG. 2, it is convenient to consider a simple model, in which the first conducting layer 1, the second conducting layer 2, and two conducting base portions 3 and 4 are regarded as inductors, and the slit 5 on the first conducting layer 1 acts as a capacitor. The resonant circuit structure acts to suppress surface waves at the metallic surface. When the impedance of the resonant circuit structure is in match with the RF device 6, preferably in conjugate match, the maximum power will be transferred to the RF device 6.

Figure 3A:
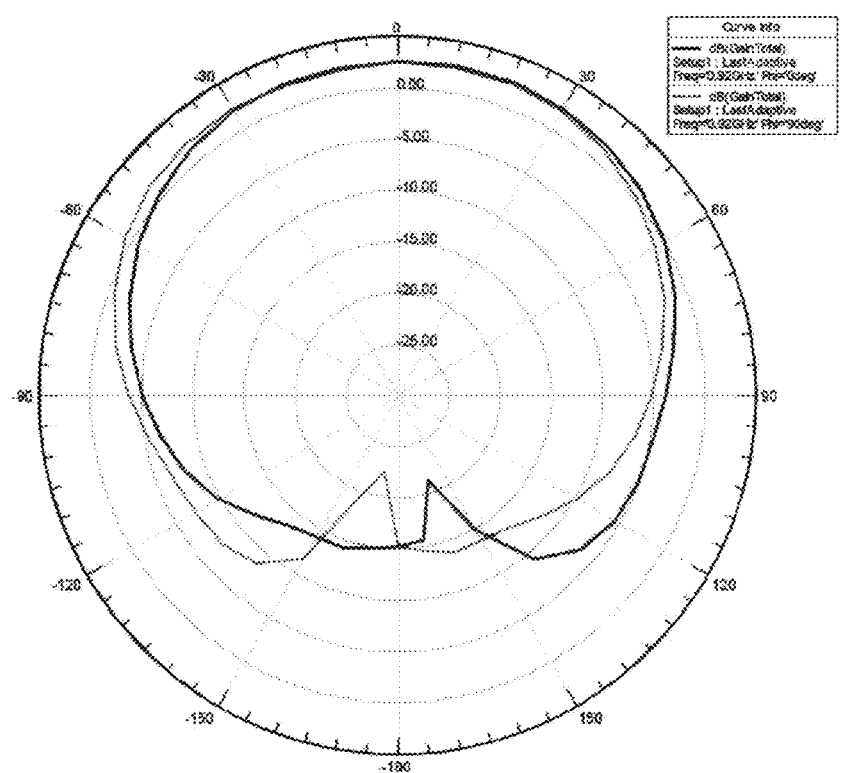
FIG. 3A shows the radiation gain pattern of the RF tag having the resonant circuit structure illustrated in FIG. 1 when placed on a metal surface.
Figure 3B:
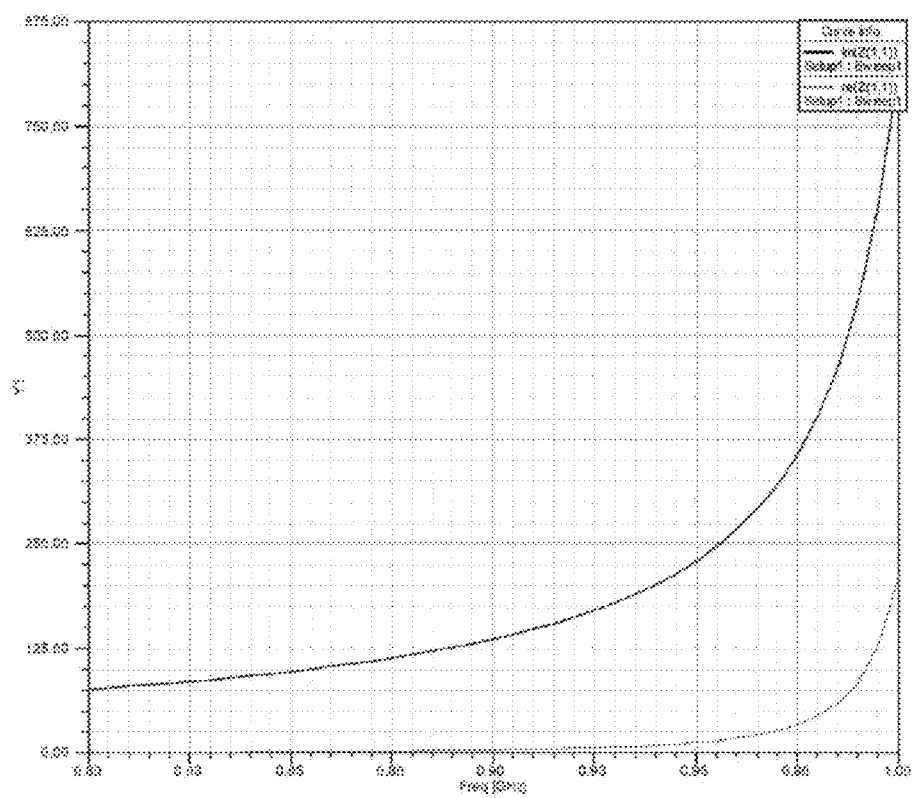
FIG. 3B shows the impedance pattern of the RF tag having the resonant circuit structure illustrated in FIG. 1 when placed on a metal surface.
Figure 3C:
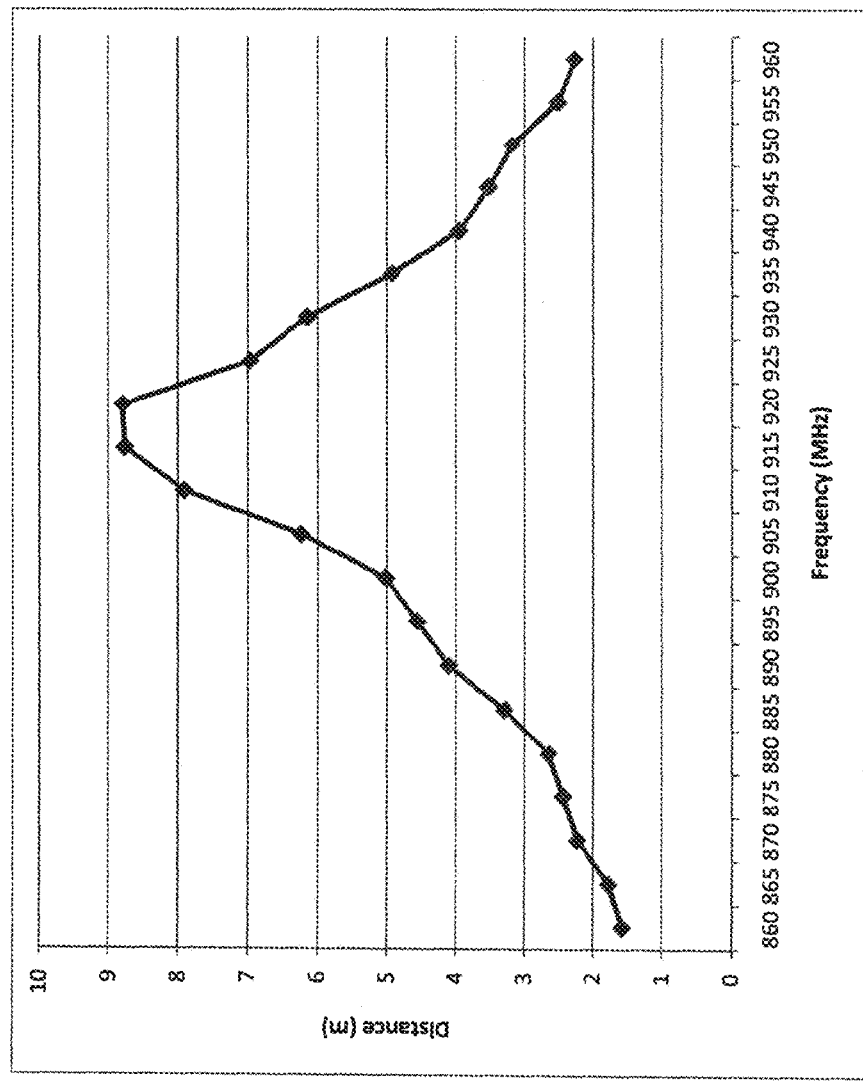
FIG. 3C shows the measured reading range of the RFID (Radio Frequency Identification) tag according to the embodiment illustrated in FIG. 1 on a metallic surface.

FIG. 3A shows the radiation gain pattern of the RF tag having the resonant circuit structure illustrated in FIG. 1 when placed on a metal surface. FIG. 3B shows the impedance pattern of the RF tag having the resonant circuit structure illustrated in FIG. 1 when placed on a metal surface. The radiation gain on the metal surface is around 3 dBi. It is noted that the impedance of the resonant circuit structure is matched with the RF device 6, which is a UHF RFID chip in this case. To maximize the power transferred from the resonant circuit structure to the RFID chip, the return loss between the RFID chip and the resonant circuit structure should be minimized. The return loss between the resonant circuit structure and the RFID chip is:

$$|S|^2 = \left|\frac{Z_L - Z_S^*}{Z_L + Z_S}\right|^2, 0 \le |S|^2 \le 1,$$

where $Z_L$ is the antenna (the resonant circuit structure) impedance and $Z_S$ is the RFID chip impedance. FIG. 3C shows the measured reading range of the RFID (Radio Frequency Identification) tag according to this embodiment on a metallic surface. The maximum reading range at 920 MHz is around 9 meters.

Figure 4B:
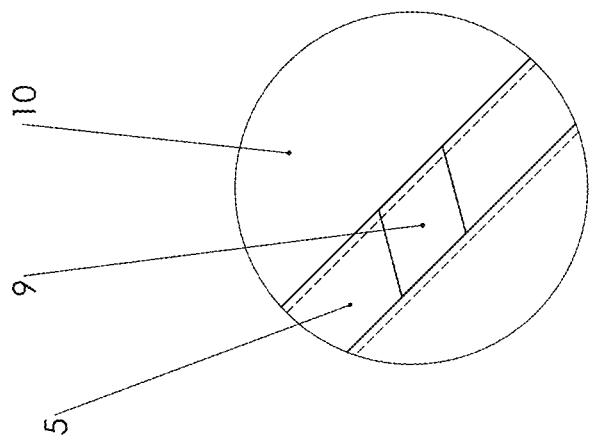
FIG. 4B is a partial magnified view of the RF device module as depicted in FIG. 4A.
Figure 4A:
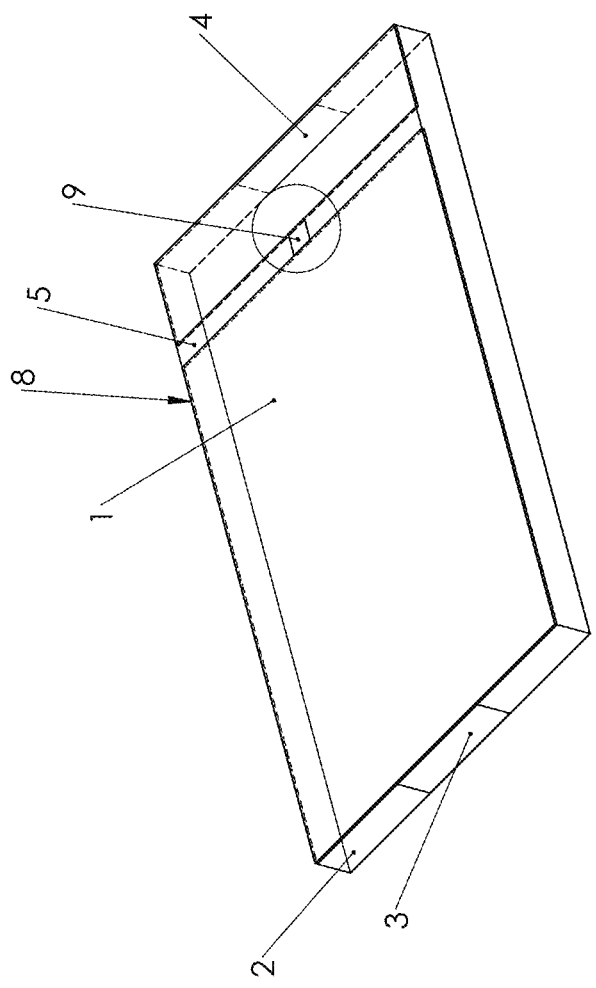
FIG. 4A shows another embodiment of the present patent application in which a RF device module is placed proximate to the first conducting layer as illustrated in FIG. 1.

FIG. 4A shows another embodiment of the present patent application in which a RF device module 8 is placed proximate to the first conducting layer 1 as illustrated in FIG. 1. FIG. 4B is a partial magnified view of the RF device module 8 as depicted in FIG. 4A. Referring to FIG. 4A and FIG. 4B, the RF device module 8 includes a conducting layer 10 and a RF device 9. There is a slit on the conducting layer 10 which separates the conducting layer 10 into two islands spaced apart from each other. The RF device 9 is electrically connected to the conducting layer 10 and disposed over the slit on the conducting layer 10. The electromagnetic power is transferred to the RF device module 8 from the surface of the first conducting layer 1 through capacitive coupling. Preferably, the conducting layer 10 of the RF device module 8 is made of substantially the same size as the first conducting layer 1, an advantage of which is the reduced complexity and the manufacturing cost of the RF tag.

Figure 5A:
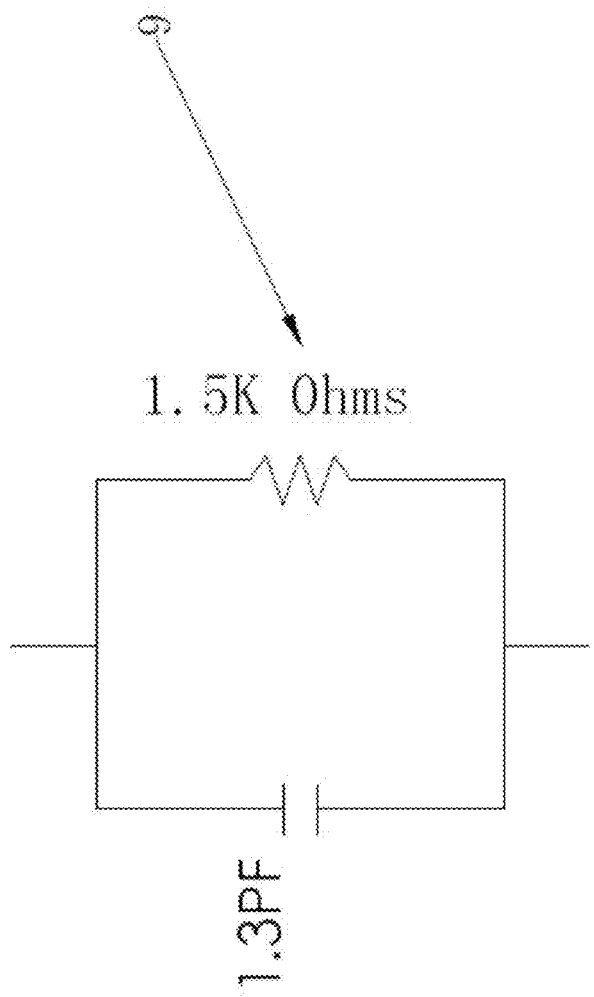
FIG. 5A shows the equivalent schematic circuit model of a commercially available passive UHF RFID chip.
Figure 5B:
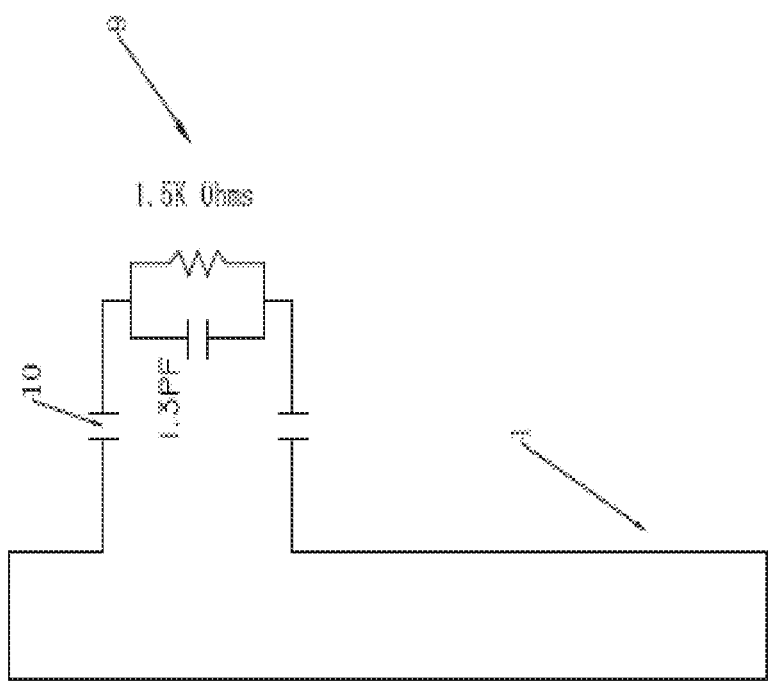
FIG. 5B shows the equivalent schematic circuit model of the RF device module connected to the resonant circuit structure through capacitive coupling according to the embodiment illustrated in FIG. 4A.

It is convenient to consider a simplistic model of the capacitive coupling between the RF device module 8 and the resonant circuit structure. The RF device module 8 will not function in free space, for instance, in the UHF (Ultra High Frequency) band. The conducting layer 10 of the RF device module 8 is not electrically connected but capacitively couple with the first conducting layer 1 in this embodiment. FIG. 5A shows the equivalent schematic circuit model of a commercially available passive UHF RFID chip, which is a capacitor and resistor connected in parallel. FIG. 5B shows the equivalent schematic circuit model of the RF device module 8 connected to the resonant circuit structure through capacitive coupling. The passive UHF RFID chip 9 is connected to the resonant circuit structure through two capacitors. When the conducting pads 10 of RF device module are made of the same size as the first conducting layer 1 of the resonant circuit structure, the capacitance between the RF device module 8 and the resonant circuit structure is maximized and the detuning effects introduced by capacitive coupling are minimized. It can also be seen that the small conducting pads of the RF device module 8 will lead to impedance mismatch between the RF device 9 and the resonant circuit structure, which detunes the resonant circuit structure.

Figure 6A:
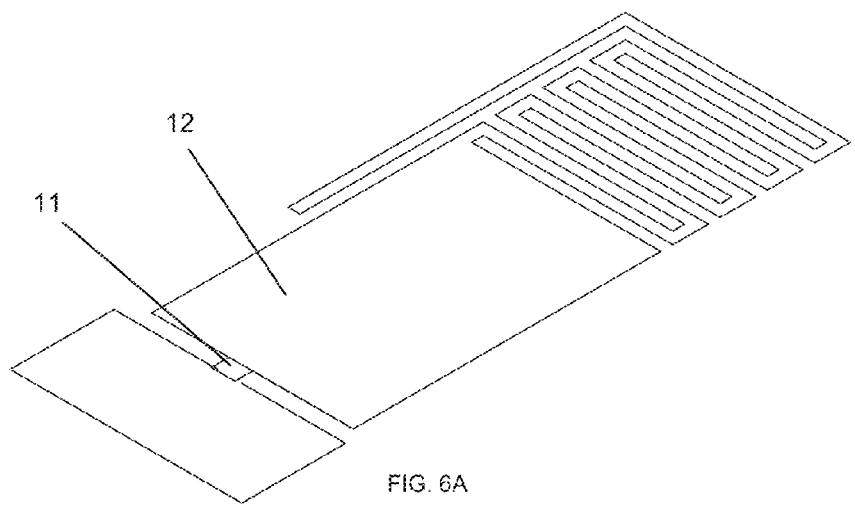
FIG. 6A shows a top perspective view of a RF tag including a RF device and a RF tag antenna according to another embodiment of the present patent application.
Figure 6B:
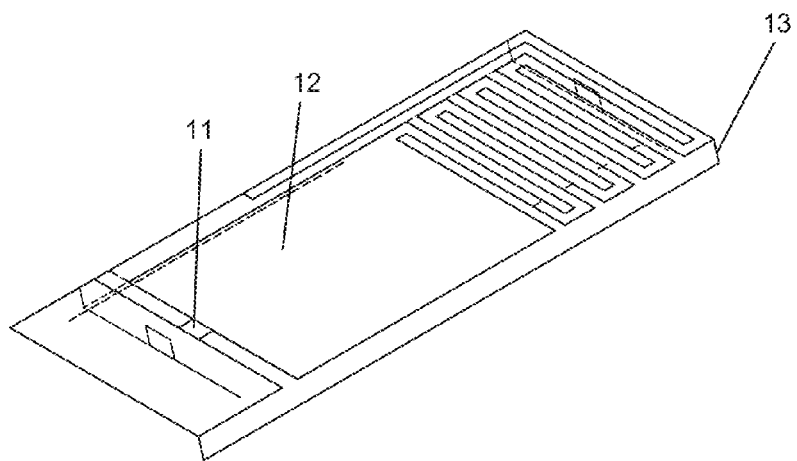
FIG. 6B shows a perspective view of the RF tag depicted in FIG. 6A placed proximate to the resonant circuit structure depicted in FIG. 1.

FIG. 6A shows a perspective view of a RF tag including a RF device 11 and a RF tag antenna 12 according to another embodiment of the present patent application. This RF tag is a passive UHF RFID tag, which can operate according to EPC Class 1 Generation 2 standard. The antenna is tuned to match with RFID chip 11's impedance. FIG. 6B shows a perspective view of the RF tag depicted in FIG. 6A placed proximate to the resonant circuit structure 13 depicted in FIG. 1. The resonant circuit structure 13 is tuned to match with RFID chip 11's impedance. The electromagnetic power received by the resonant circuit structure is transferred to the RF tag through capacitive coupling.

Through the above embodiments, it is understood that the RF device or the RF chip may be electrically coupled, which means directly electrically connected or capacitively coupled (but not directly electrically connected), to the first conducting layer of the resonant circuit structure.

Figure 7A:
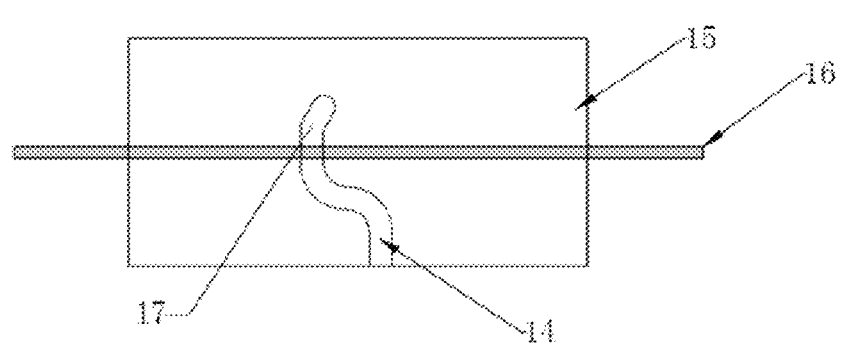
FIG. 7A shows a plan view of a commercially available passive UHF RFID tag, AD843 from Avery Dennison.
Figure 7B:
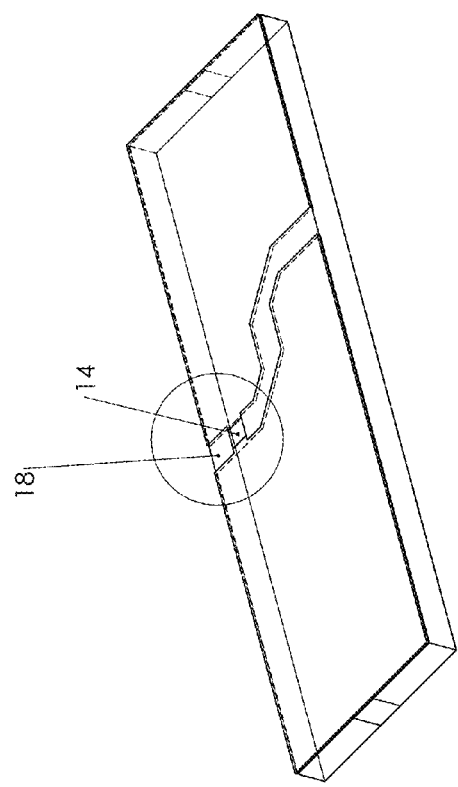
FIG. 7B illustrates another embodiment of the present patent application utilizing the UHF RFID tag depicted in FIG. 7A.
Figure 7C:
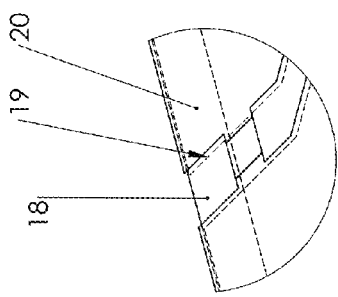
FIG. 7C is a partial magnified view of the embodiment depicted in FIG. 7B.

FIG. 7A shows a plan view of a commercially available passive UHF RFID tag, AD843 from Avery Dennison. FIG. 7B illustrates another embodiment of the present patent application utilizing the UHF RFID tag depicted in FIG. 7A. FIG. 7C is a partial magnified view of the embodiment depicted in FIG. 7B. The passive UHF RFID tag includes a RFID chip 14, and an RFID tag antenna 15. There is also an absence 17 on AD843 where the RFID chip is electrically connected to RFID tag antenna over the absence. In this embodiment, the commercially available passive UHF RFID tag is trimmed along the line 16. The trimming process spaced the AD843 to two conducting islands 20 spaced apart from each other, and the RFID chip 14 is electrically connected to two conducting islands 20 over the slit 18. The resonant circuit structure with a slit on the first conducting layer 19, similar as in the embodiment illustrated in FIG. 1, is designed to match the RFID chip 14's impedance. Preferably, the slit on the first conducting layer 19 is of the same size as the slit on the trimmed RFID tag, such as AD843. The electromagnetic power received by the resonant circuit structure is transferred to the RF tag through capacitive coupling.

Figure 8A:
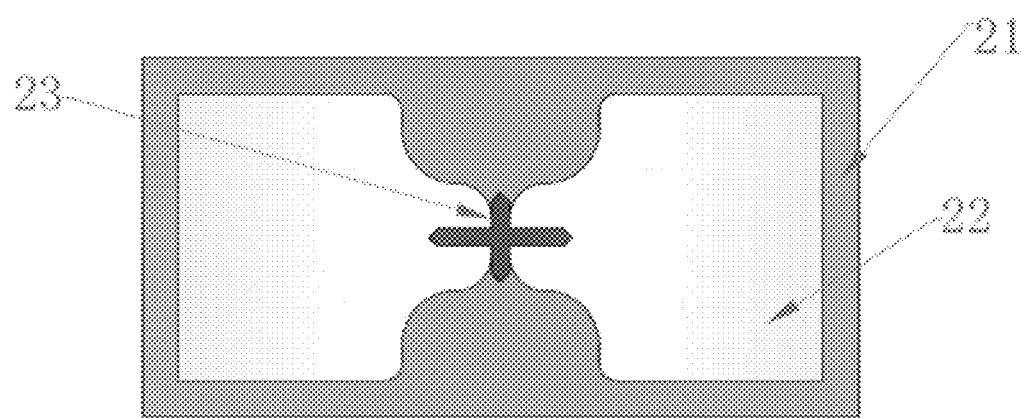
FIG. 8A shows a plan view of a commercially available RFID strap.
Figure 8B:
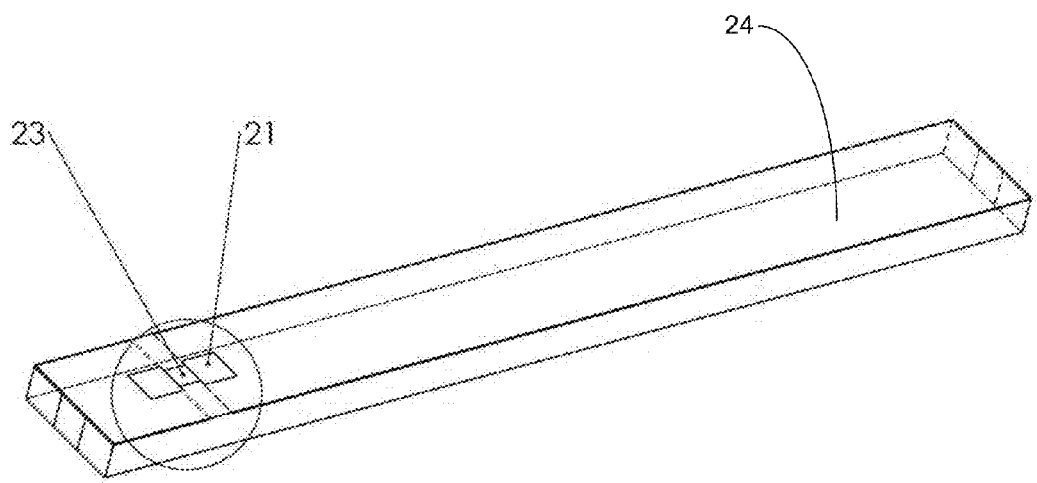
FIG. 8B illustrates another embodiment of the present patent application utilizing the RFID strap depicted in FIG. 8A.
Figure 8C:
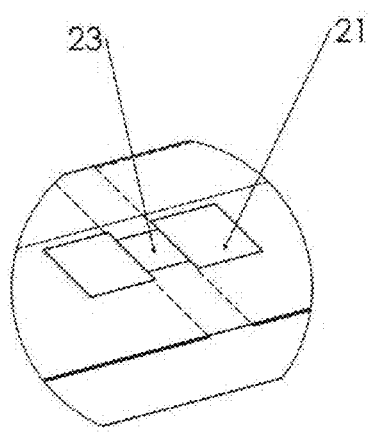
FIG. 8C is a partial magnified view of the embodiment depicted in FIG. 8B.

FIG. 8A shows a plan view of a commercially available RFID strap. FIG. 8B illustrates another embodiment of the present patent application utilizing the RFID strap depicted in FIG. 8A. FIG. 8C is a partial magnified view of the embodiment depicted in FIG. 8B. Referring to FIGS. 8A-8C, another design of the RF device module is in the form of RFID strap 21, wherein the RFID chip 23 is electrically connected to two conductive pads 22. The RF device module (i.e. RFID strap) is placed proximate to the first conducting layer 24 of the resonant circuit structure in this embodiment. Usually, the RFID strap size is 3 mm×9 mm, which is always much smaller than the resonant circuit structure. The coupling capacitance is smaller than the larger RF device modules in other embodiments. The impedance at the RFID chip side will change a lot. The resonant frequency of the resonant circuit structure needs to be reduced, so as to match the impedance to RFID chip. It is noted that the impedance of the resonant circuit structure is:

$$Z = \frac{j\omega L}{1 - \omega^2 LC}$$

where Z is the impedance of the surface, w is the frequency of the incident electromagnetic wave, L is the inductance and C is the capacitance. It is apparent that the optimized size of the resonant circuit structure is related to the equivalent circuit model. The parameters are co-related to each other.

Figure 9A:
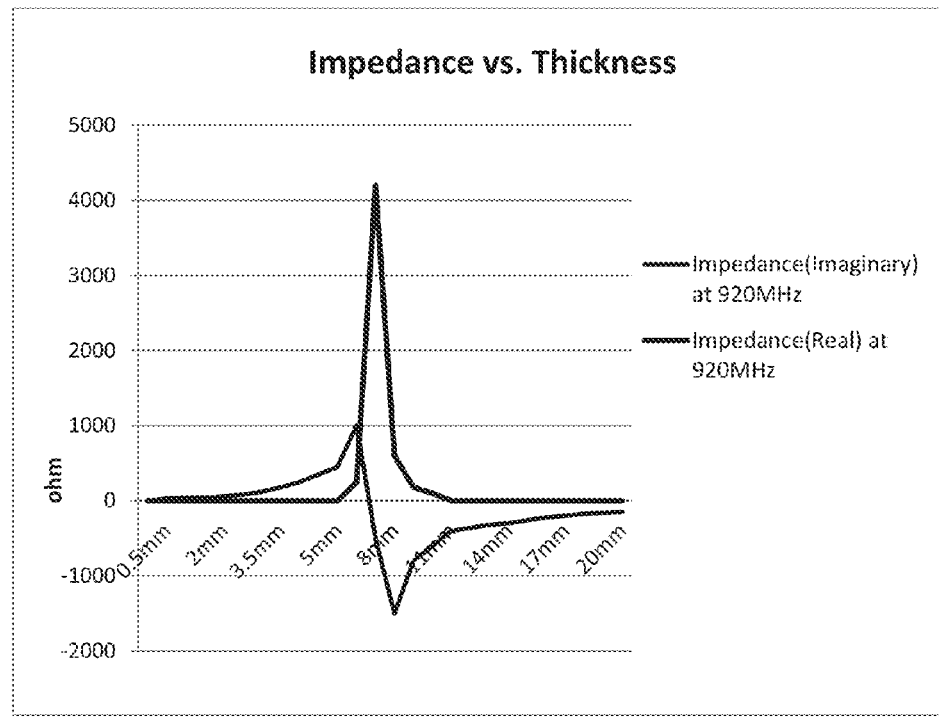
FIG. 9A shows the simulated impedance of the resonant circuit structure as depicted in FIG. 1 versus the thickness of the resonant circuit structure.
Figure 9B:
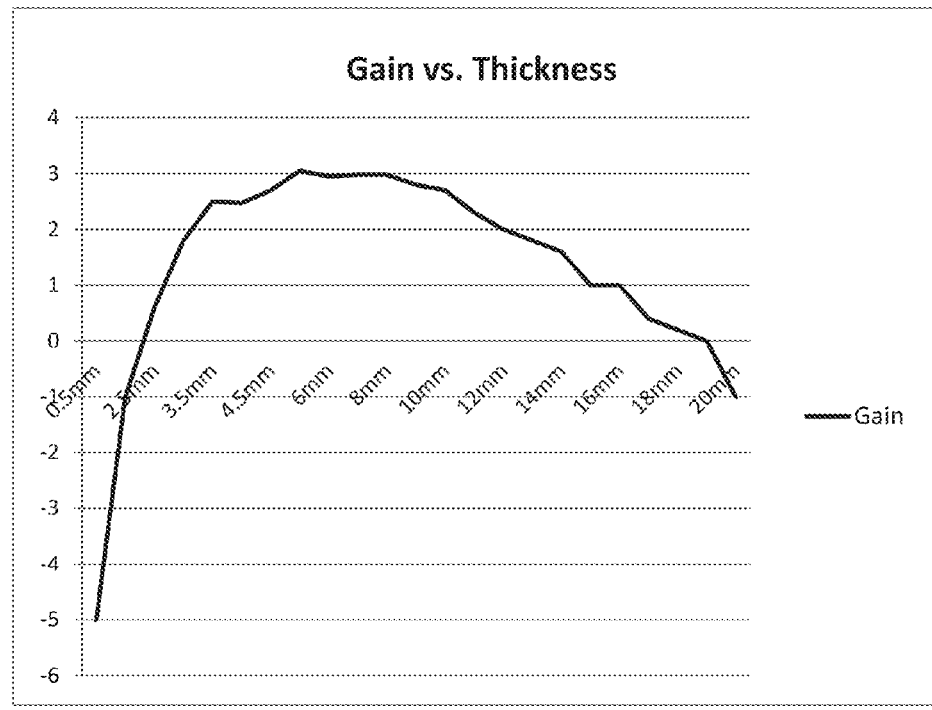
FIG. 9B shows the simulated radiation gain of the resonant circuit structure as depicted in FIG. 1 versus the thickness of the resonant circuit structure.
Figure 9C:
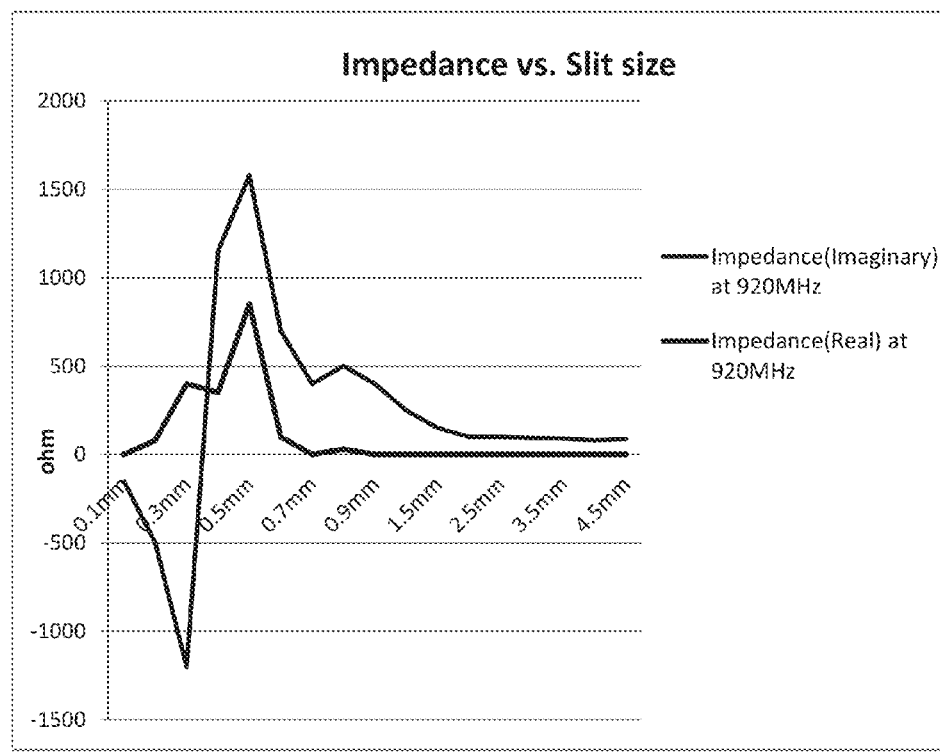
FIG. 9C shows the simulated impedance of the resonant circuit structure as depicted in FIG. 1 versus the slit size of the resonant circuit structure.
Figure 9D:
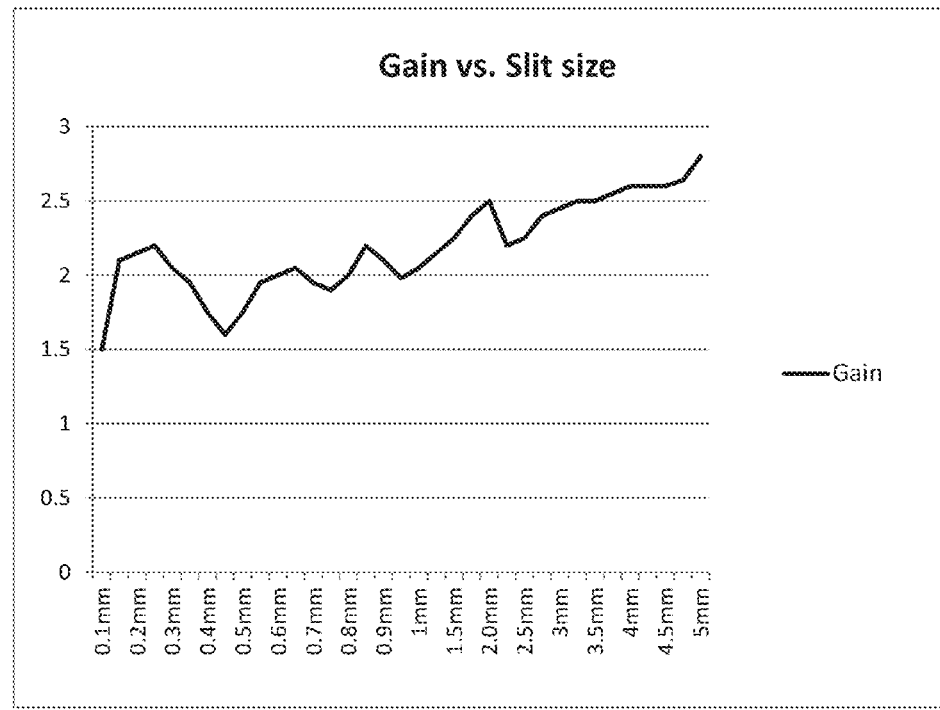
FIG. 9D shows the simulated radiation gain of the resonant circuit structure as depicted in FIG. 1 versus the slit size of the resonant circuit structure.
Figure 9E:
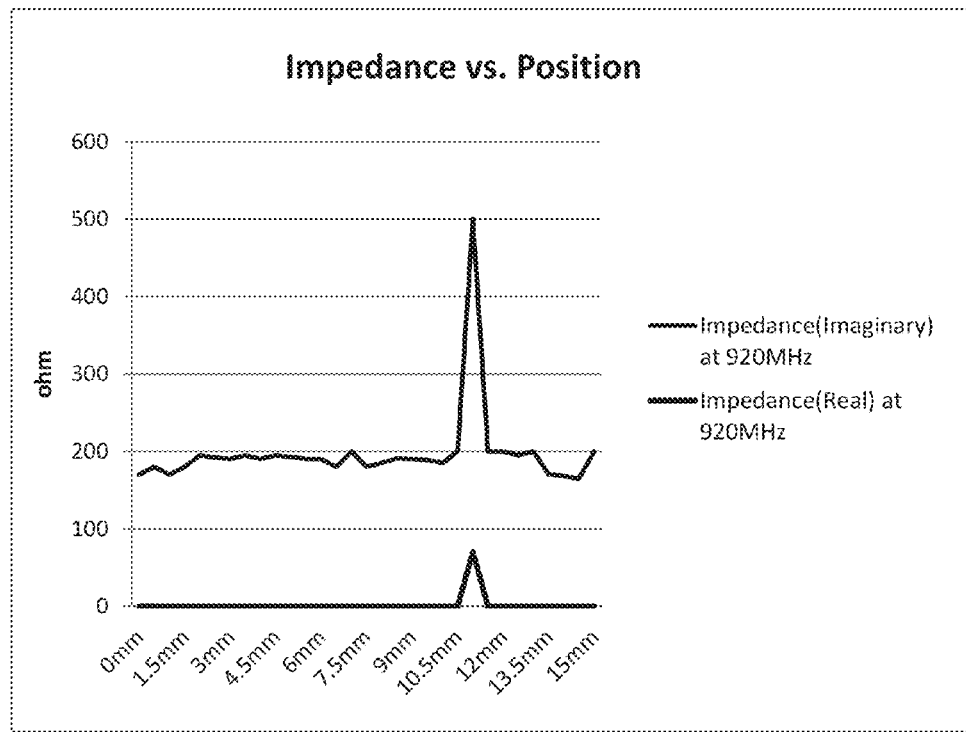
FIG. 9E shows the simulated impedance of the resonant circuit structure as depicted in FIG. 1 versus the position of RF device along the direction of slit of the resonant circuit structure.
Figure 9F:
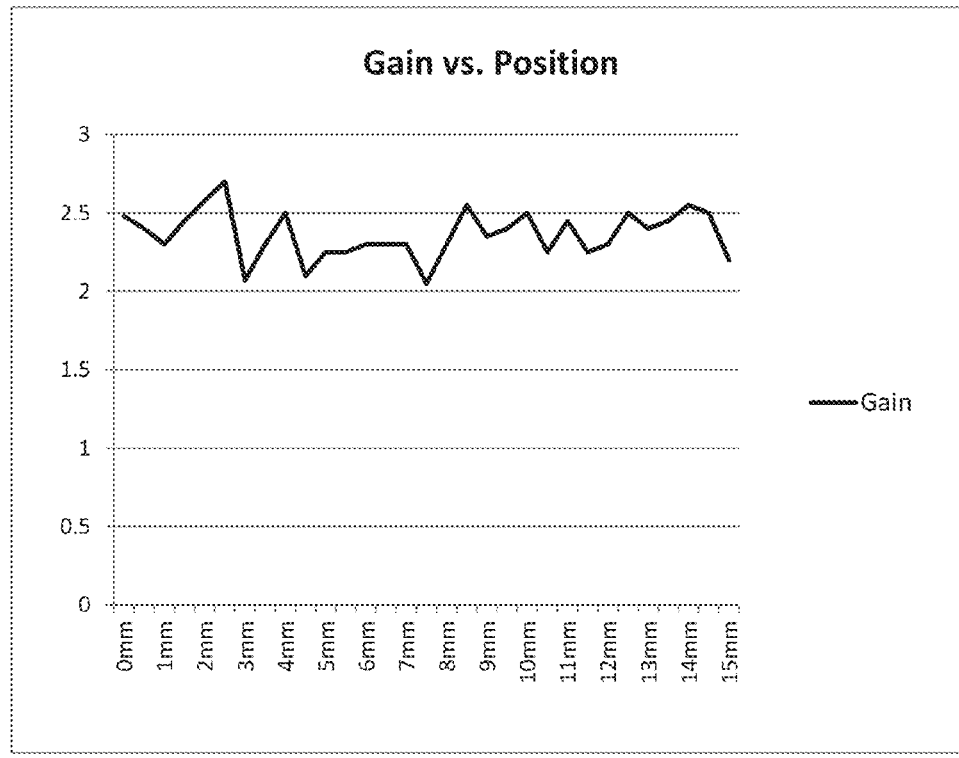
FIG. 9F shows the simulated gain of the resonant circuit structure as depicted in FIG. 1 versus the position of RF device along the direction of slit of the resonant circuit structure.

Considering the effects of various parameters on the performance of the resonant circuit structure, a finite element simulation software is used to model various configurations designed to operate at 920 MHz, which is the passive UHF RFID operation frequency in China. The simulated resonant circuit impedance and radiation gain are recorded. FIG. 9A shows the simulated impedance of the resonant circuit structure as depicted in FIG. 1 versus the thickness of the resonant circuit structure. FIG. 9B shows the simulated radiation gain of the resonant circuit structure as depicted in FIG. 1 versus the thickness of the resonant circuit structure. It can be seen from the plot that the impedance changed a lot when the thickness is over 5 mm. FIG. 9C shows the simulated impedance of the resonant circuit structure as depicted in FIG. 1 versus the slit size of the resonant circuit structure. FIG. 9D shows the simulated radiation gain of the resonant circuit structure as depicted in FIG. 1 versus the slit size of the resonant circuit structure. It is noted that the first conducting layer with a slit on it can be seen as a capacitor. When the slit size is becoming small, the capacitance of the resonant circuit structure will increase and the resonant circuit structure will be at the resonant mode at a lower frequency. FIG. 9E shows the simulated impedance of the resonant circuit structure as depicted in FIG. 1 versus the position of RF device along the direction of slit of the resonant circuit structure. FIG. 9F shows the simulated gain of the resonant circuit structure as depicted in FIG. 1 versus the position of RF device along the direction of slit of the resonant circuit structure. Since the impedance of the resonant circuit structure mainly depends on the intrinsic inductance and intrinsic capacitance, the position of RF device on slit will not have much effect on the performance of the resonant circuit structure.

Figure 10A:
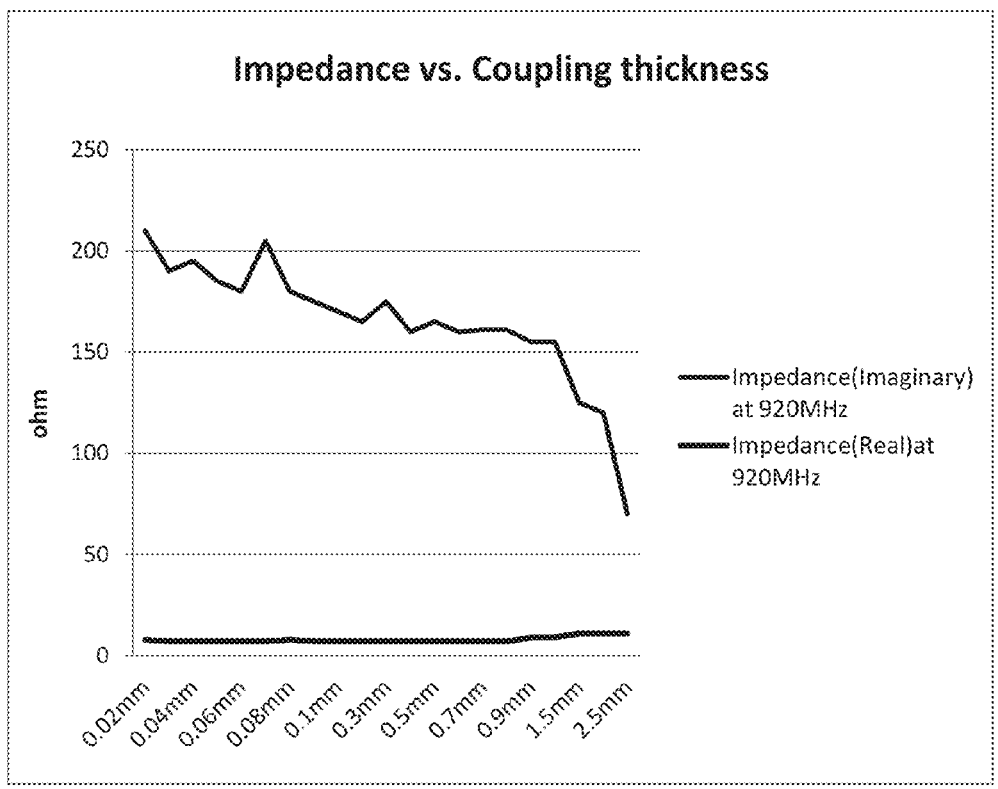
FIG. 10A shows the simulated impedance of the RF tag according to an embodiment of the present patent application versus the thickness of spacer between the RF device module and the resonant circuit structure.
Figure 10B:
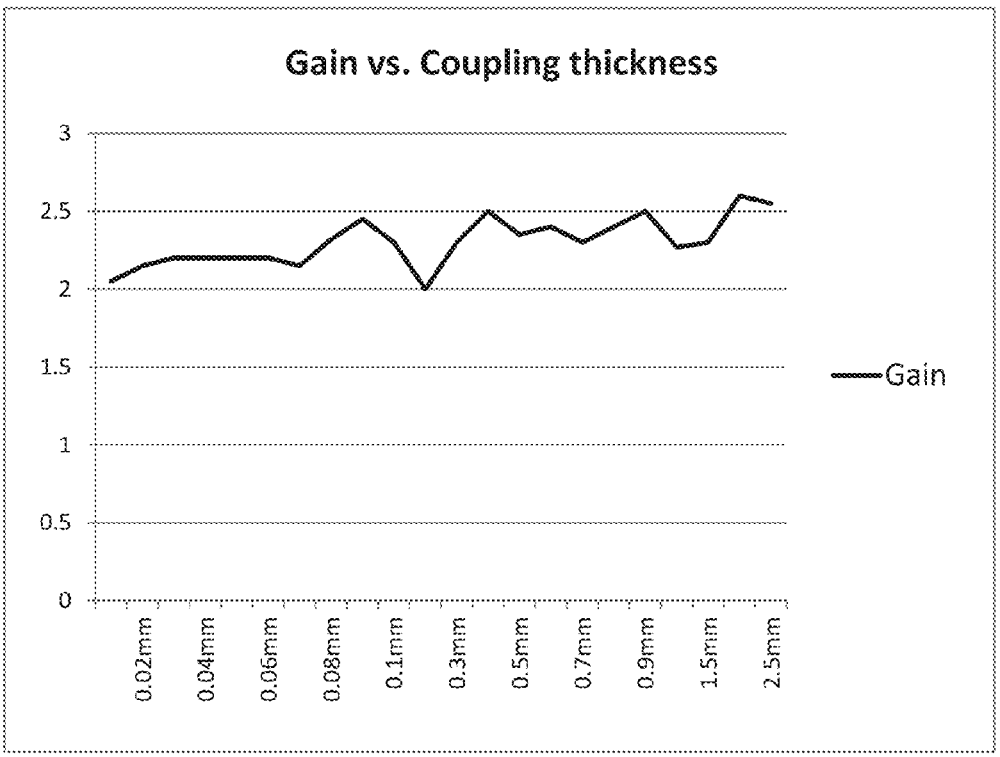
FIG. 10B shows the simulated gain of the RF tag according to an embodiment of the present patent application versus the thickness of spacer between the RF device module and the resonant circuit structure.
Figure 10C:
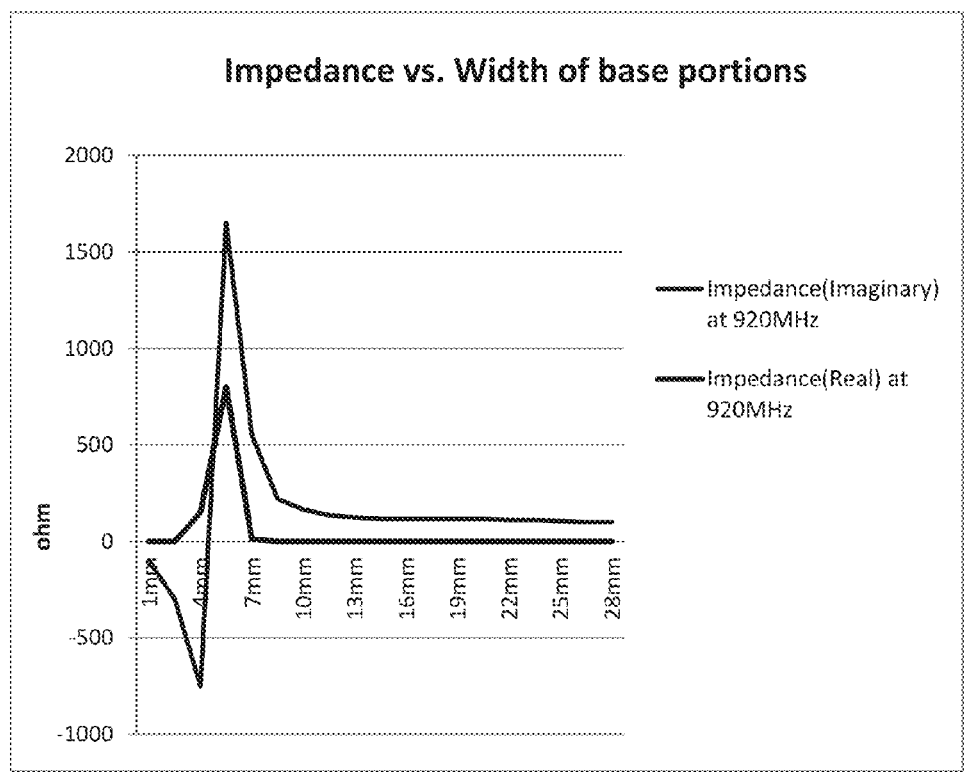
FIG. 10C shows the simulated impedance of the RF tag according to an embodiment of the present patent application versus the width of the two conducting base portions of the resonant circuit structure.
Figure 10D:
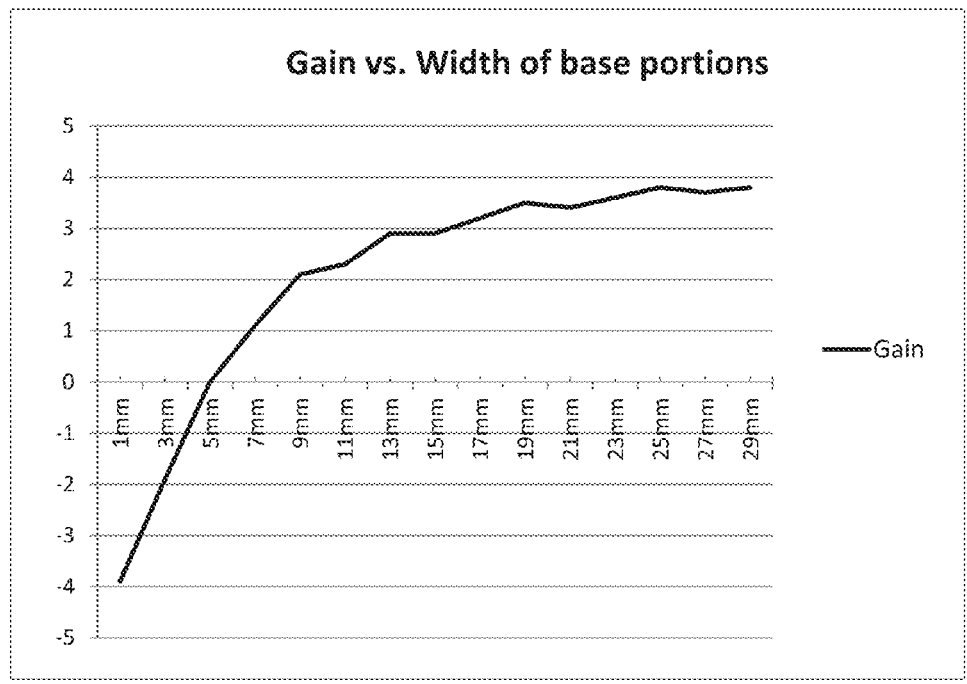
FIG. 10D shows the simulated gain of the RF tag according to an embodiment of the present patent application versus the width of the two conducting base portions of the resonant circuit structure.
Figure 10E:
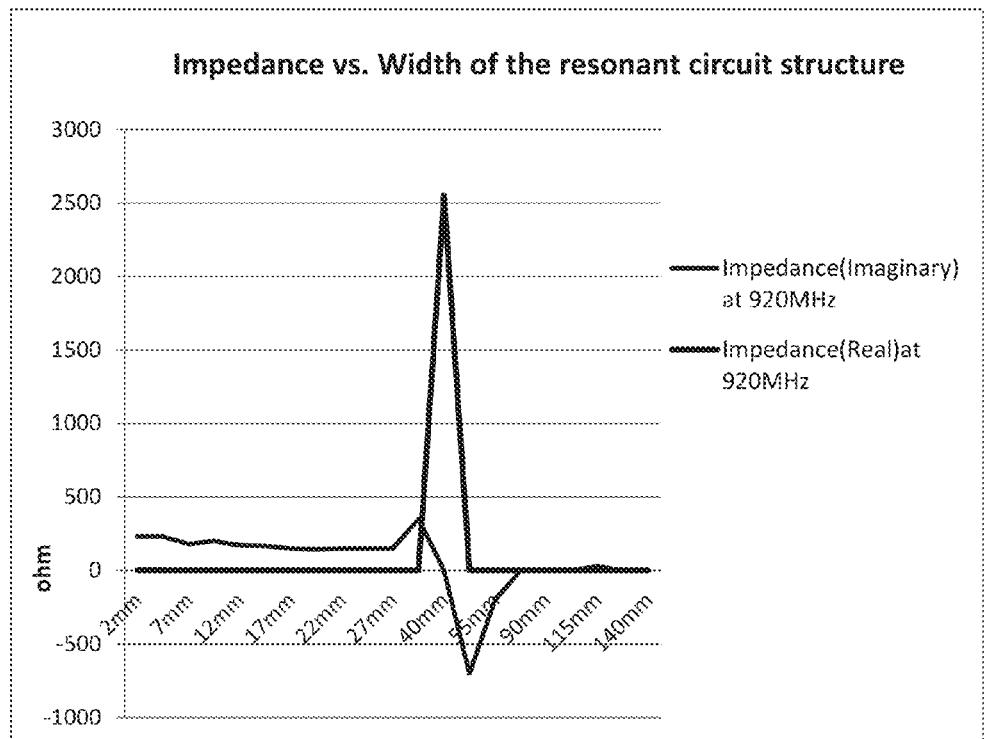
FIG. 10E shows the simulated impedance of the RF tag according to an embodiment of the present patent application versus the width of the resonant circuit structure.
Figure 10F:
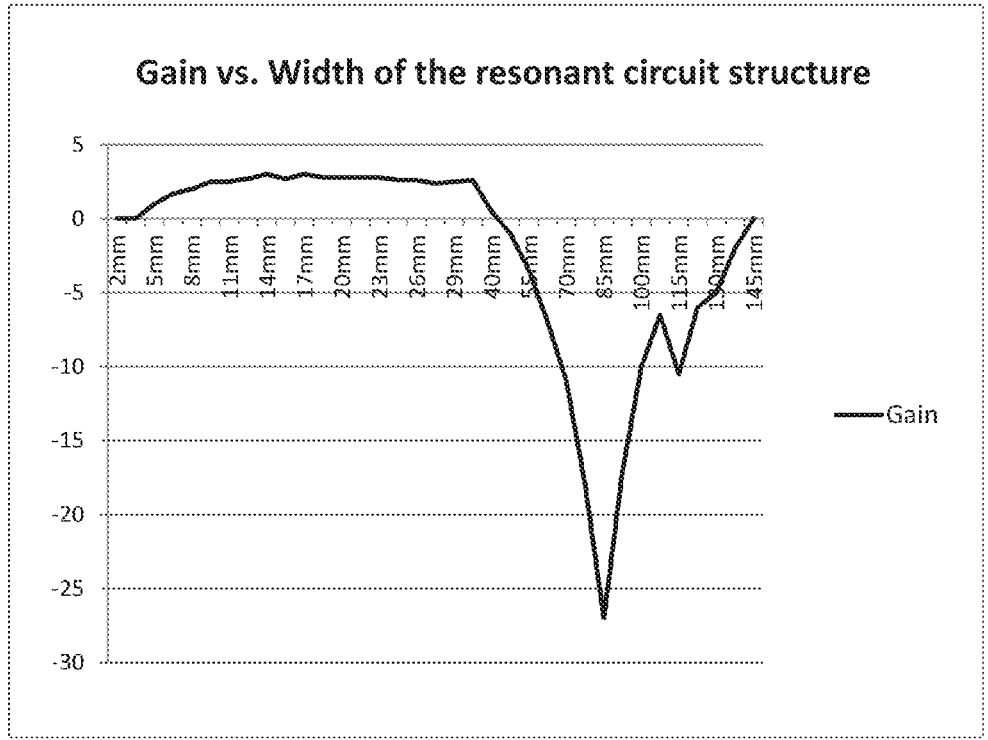
FIG. 10F shows the simulated gain of the RF tag according to an embodiment of the present patent application versus the width of the resonant circuit structure.

FIG. 10A shows the simulated impedance of the RF tag according to an embodiment of the present patent application versus the thickness of spacer between the RF device module and the resonant circuit structure. FIG. 10B shows the simulated gain of the RF tag according to an embodiment of the present patent application versus the thickness of spacer between the RF device module and the resonant circuit structure. It is noted that the RF device module is connected with the resonant circuit structure through capacitive coupling. A thicker spacer will have bigger detuning effect of impedance. FIG. 10C shows the simulated impedance of the RF tag according to an embodiment of the present patent application versus the width of the two conducting base portions of the resonant circuit structure. FIG. 10D shows the simulated gain of the RF tag according to an embodiment of the present patent application versus the width of the two conducting base portions of the resonant circuit structure. It is noted that in the equivalent circuit of the resonant circuit structure, the width of the two conducting base portions are related to the intrinsic inductance of the resonant circuit structure. FIG. 10E shows the simulated impedance of the RF tag according to an embodiment of the present patent application versus the width of the resonant circuit structure. FIG. 10F shows the simulated gain of the RF tag according to an embodiment of the present patent application versus the width of the resonant circuit structure. Since the resonant circuit structure is usually excited by an electric field, only the longitudinal direction size will contribute to the resonant mode of the resonant circuit structure. The width of the resonant circuit structure should have limited effects on the resonant frequencies. However, when the width changes to a certain size, the resonant frequent will change and the width will have a big effect on the resonant frequency. It should be noted that while the performance of RF tag may be better with certain values of the resonant circuit structure's parameters, such as thickness and width, these parameters of the RF tag are correlated to each other. Further it should be realized that other values of the resonant circuit structure's parameters may yield better performance under different parameter combinations.

As the size of the conducting pads of the RF device module is reduced, the power transferred to the RF device and the impedance mismatch introduced by detuning effects will be reduced. In the limit where the size of conducting pads approaches zero, there will be no power transferred to the RF device.

Figure 11:
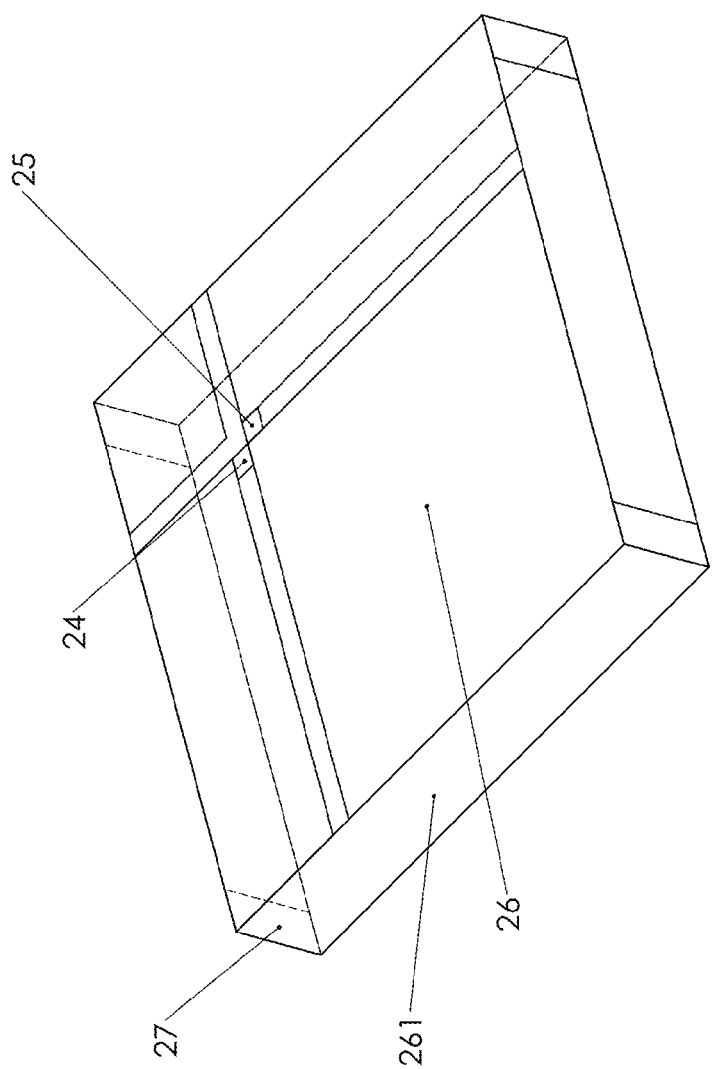
FIG. 11 shows two RF devices electrically connected to a first conducting layer of a resonant circuit structure according to another embodiment of the present patent application with 90 degrees between their orientations.

Some RF tag readers possess directional reader antennas, which transmit electromagnetic waves with linear polarization and therefore may only operate correctly when the tags are orientated in directions that match with the reader antennas. Orientation problems may be overcome by using circular polarized reader antennas or using RF tag with dual polarizations. FIG. 11 shows two RF devices 24 and 25 electrically connected to a first conducting layer 26 of a resonant circuit structure according to another embodiment of the present patent application with 90 degrees between their orientations. There are two orthogonal slits formed on the first conducting layer 26, dividing the first conducting layer into four islands spaced apart from each other. The first conducting layer 26 is connected to a second conducting layer 261 by two conducting base portions 27. Each RF device is matched with the resonant circuit structure. Radiation of each RF device could be excited by a linear polarized RF tag reader antenna. The combination of two orthogonal RF tags apart from each other by 90 degrees may be activated whatever the polarization of the incident radiation is.

Figure 12:
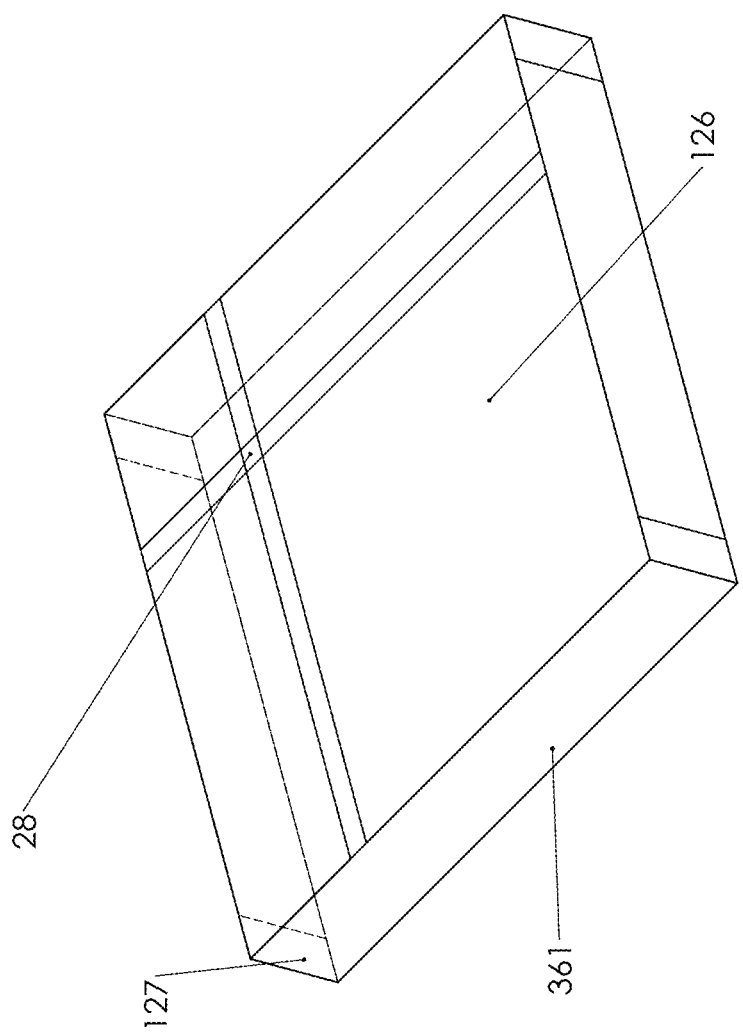
FIG. 12 illustrates a dual polarized RF tag according to another embodiment of the present patent application.

Another design of a dual polarized RF tag is using a RF device 28, which has two independent signal outputs, such as an Impinj's Monza passive UHF RFID chip, as shown in FIG. 12, which illustrates a dual polarized RF tag according to another embodiment of the present patent application. The RF device 28 is electrically connected to first conducting layer 126, which is divided to four orthogonal islands by two slits. The first conducting layer 126 is connected to a second conducting layer 361 by two conducting base portions 127. Each RF device's output is matched with the resonant circuit structure. The combination of two orthogonal RF tag outputs separated by 90 degrees may be activated whatever the polarization of the incident radiation is.

Figure 13:
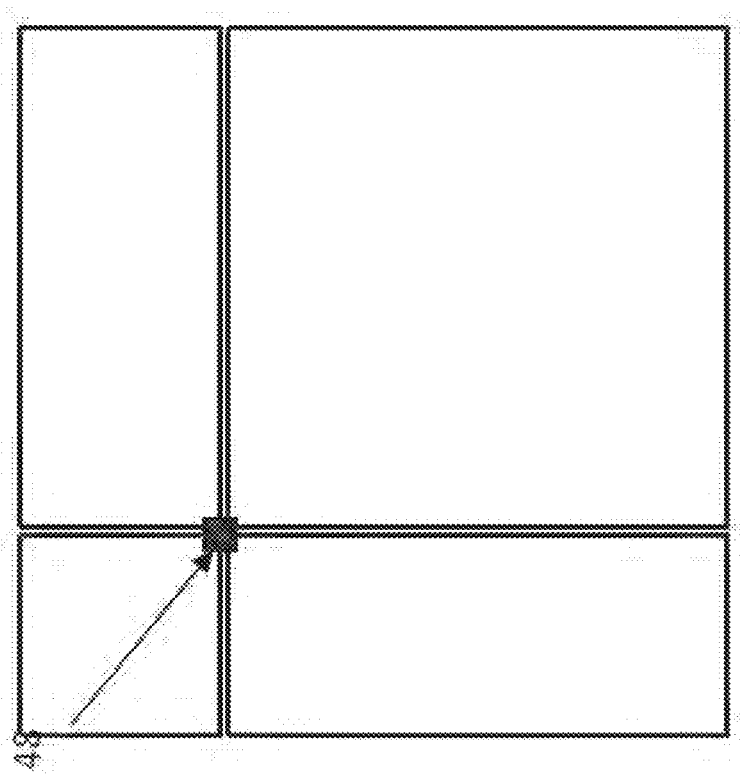
FIG. 13 shows some possible configurations of a resonant circuiting structure for a dual port RFID chip according to another embodiment of the present patent application.
Figure 13:
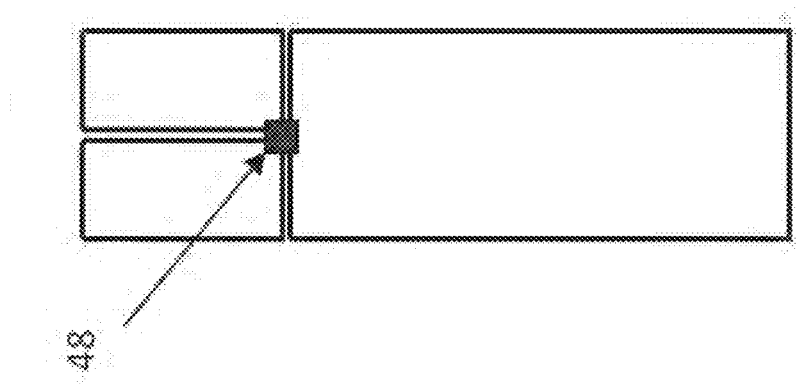

FIG. 13 shows some possible configurations of a resonant circuiting structure for a dual port RFID (Radio Frequency Identification) chip according to another embodiment of the present patent application. A dual port RFID chip 48 electrically attached on these configurations. The RF tag may be read by linear polarized reader antenna by any direction.

Figure 14:
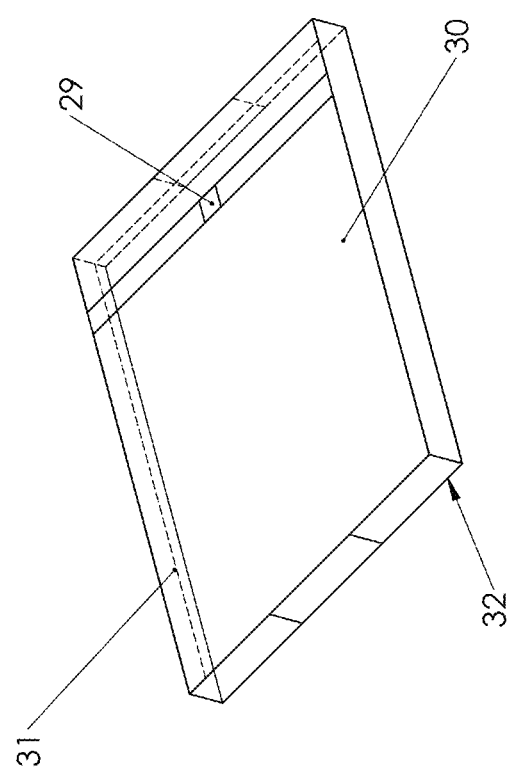
FIG. 14 shows a RF tag according to another embodiment of the present patent application in which an internal conducting layer is added.

FIG. 14 shows a RF tag according to another embodiment of the present patent application in which an internal conducting layer 31 is added to increase the capacitance of the resonant circuit structure. The internal conducting layer 31 will form a capacitor with first conducting layer 30, and the second conducting layer 32, which will increase the capacitance of the resonant circuit structure and reduce the size of the resonant circuit structure.

Figure 15:
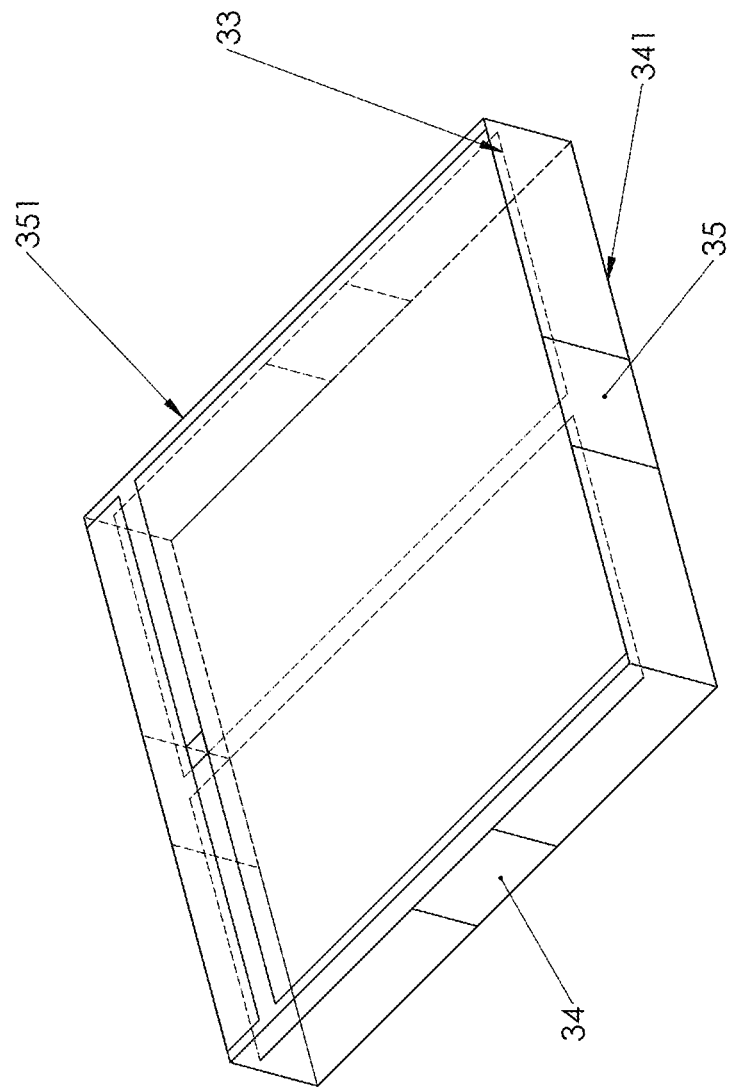
FIG. 15 shows a RF tag according to another embodiment of the present patent application.

FIG. 15 shows a RF tag according to another embodiment of the present patent application. Comparing to the embodiment in FIG. 14, in this embodiment, an internal conducting layer 33 is connected to the second conducting layer 341 by two conducting portions 34. The internal conducting layer 33 will form a capacitor with the first conducting layer 351. There is also a slit 35 on internal conducting layer 33.

Figure 16:
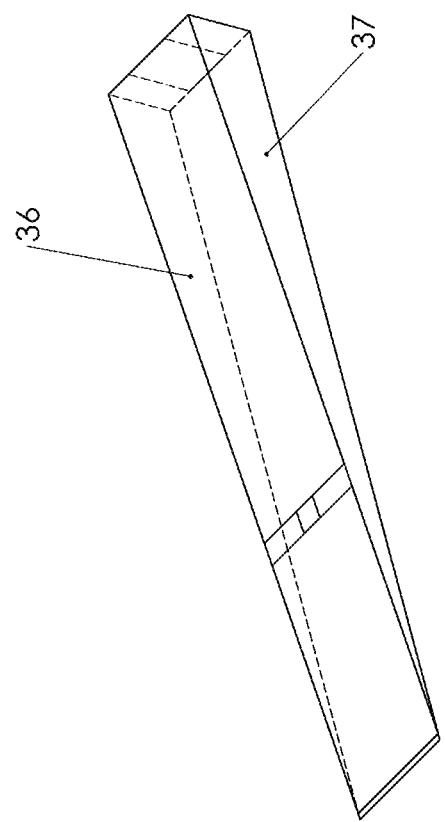
FIG. 16 shows a RF tag according to another embodiment of the present patent application.
Figure 17:
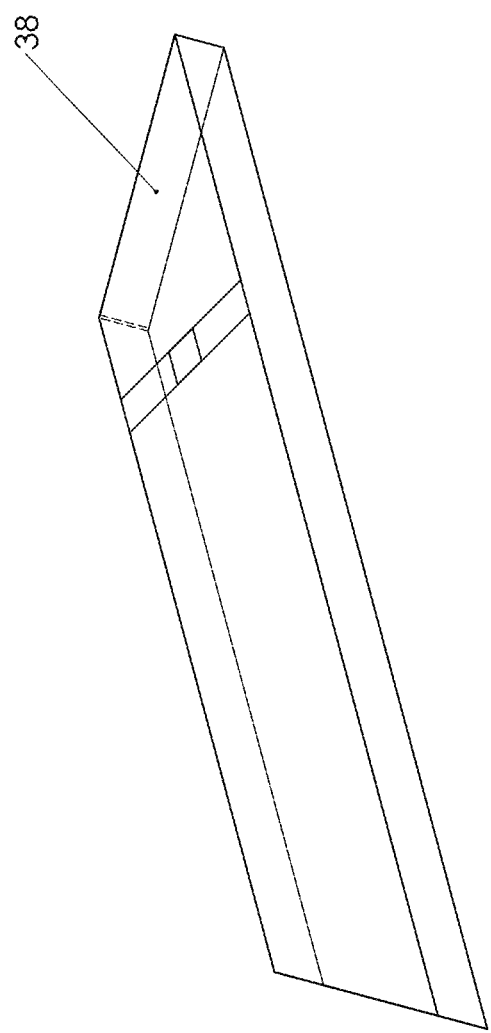
FIG. 17 shows a RF tag according to another embodiment of the present patent application.

There are also two alternative embodiments which have a broad band operation frequency property. FIG. 16 shows a RF tag according to another embodiment of the present patent application. In this embodiment, the first conducting layer 36 and the second conducting layer 37 are not in parallel. FIG. 17 shows another embodiment wherein the two conducting base portions 38 are not in parallel.

Figure 18:
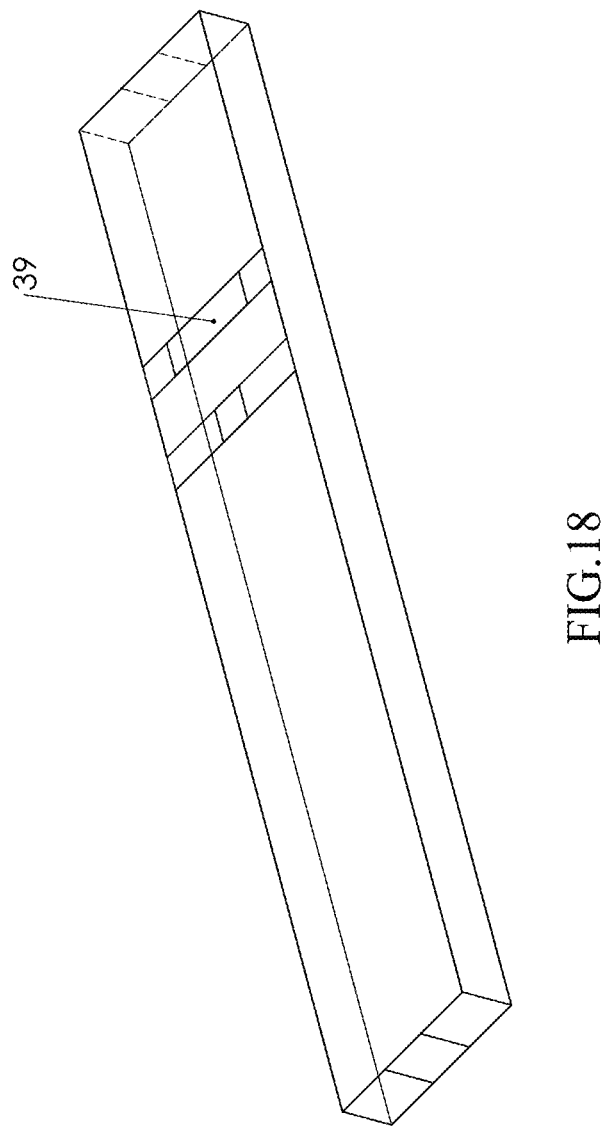
FIG. 18 shows a RF tag according to another embodiment of the present patent application.

FIG. 18 shows a RF tag according to another embodiment of the present patent application. In this embodiment, there is a discrete component 39 connected to the first conducting layer. This discrete component 39 may be either a capacitor or an inductor. When an inductor is electrically connected to the first conducting layer, the impedance change of the resonant circuit structure over frequencies will be smaller. It is can be seen that a broad band RF tag design can be achieved.

Figure 19A:
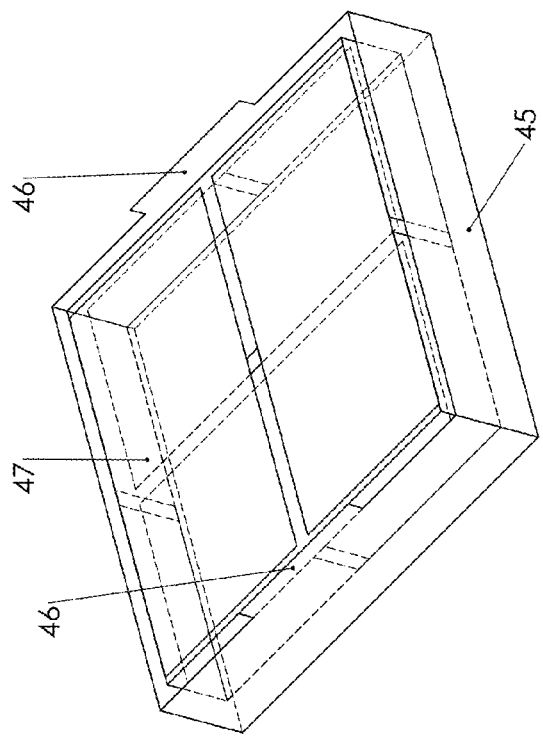
FIG. 19A shows a RF tag according to another embodiment of the present patent application.
Figure 19B:
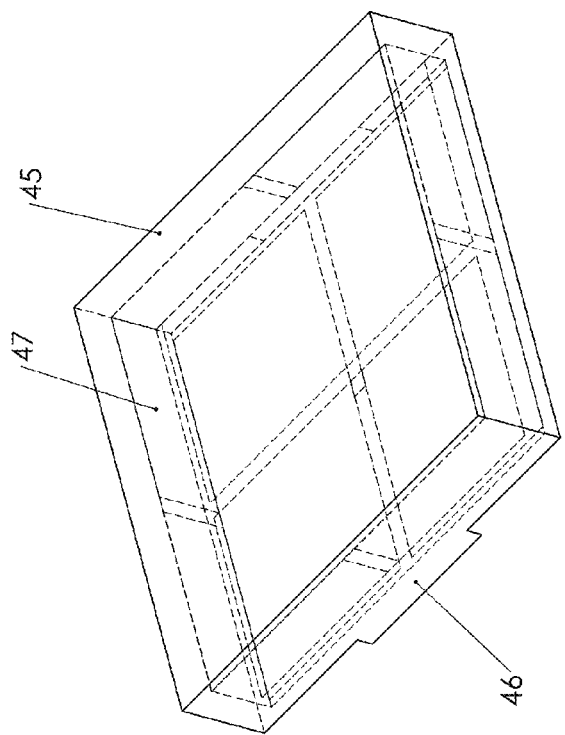
FIG. 19B shows another view of the RF tag depicted in FIG. 19A.

FIG. 19A shows a RF tag according to another embodiment of the present patent application. FIG. 19B shows another view of the RF tag depicted in FIG. 19A. In this embodiment, the RF tag 47 is protected by a metallic housing 45. There are two protuberances 46 on the metallic housing. The two protuberances 46 on the metallic housing are not aligned at the RF tag's polarization direction.

Figure 20:
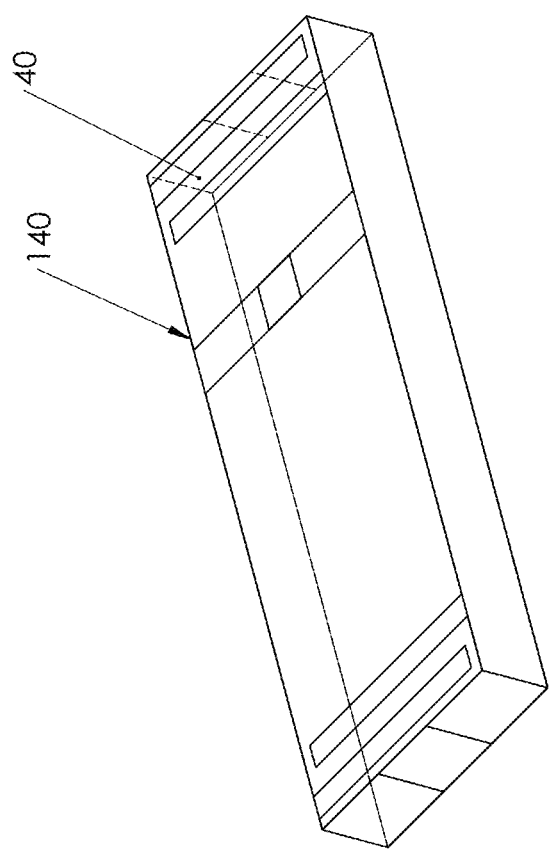
FIG. 20 shows a RF tag according to another embodiment of the present patent application.
Figure 21:
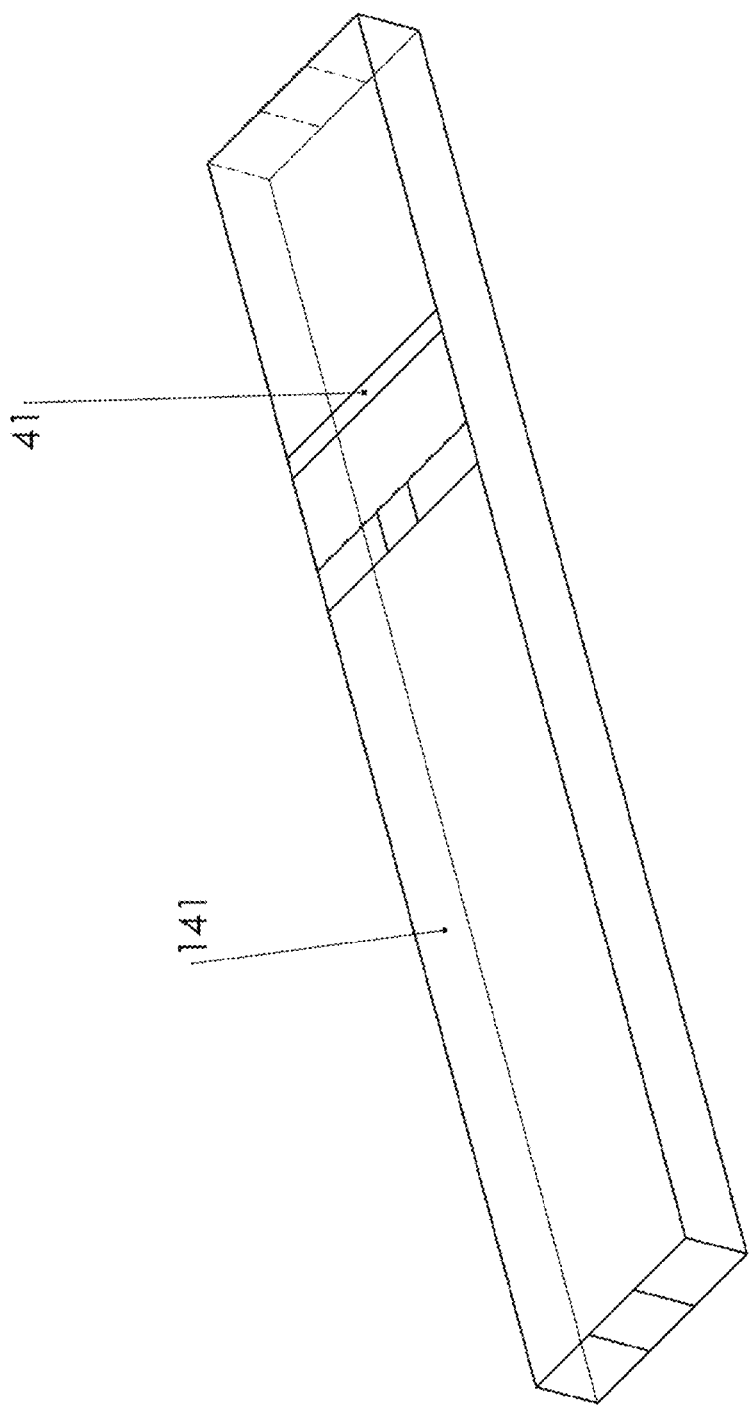
FIG. 21 shows a RF tag according to another embodiment of the present patent application.

FIG. 20 shows a RF tag according to another embodiment of the present patent application. In this embodiment, there is an intrinsic inductor 40 formed on the first conducting layer 140. FIG. 21 shows a similar embodiment in which the RF tag has an intrinsic capacitor 41 formed on the first conducting layer 141. It is similar to connecting a discrete component on the first conducting layer. The impedance change of the resonant circuit structure over frequencies will be small and a wide band RF tag can be achieved.

Figure 22:
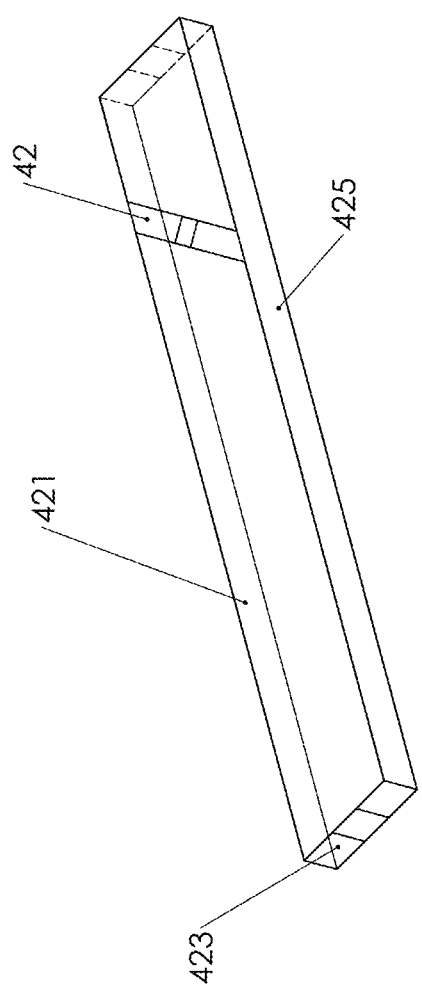
FIG. 22 shows a RF tag according to another embodiment of the present patent application.

Another design of the resonant circuit structure has a small change of impedance at a wide band of frequencies. FIG. 22 shows a RF tag according to another embodiment of the present patent application. In this embodiment, the slit 42 on the first conducting layer 421 is not parallel to the conducting base portions 423. The inductance formed by the first conducting layer 421, the second conducting layer 425, and the two base portions 423 varies along the direction of slit on the first conducting layer 421. The impedance change over frequencies is smaller when the slit 42 is not parallel to the conducting base portions 423.

Figure 23:
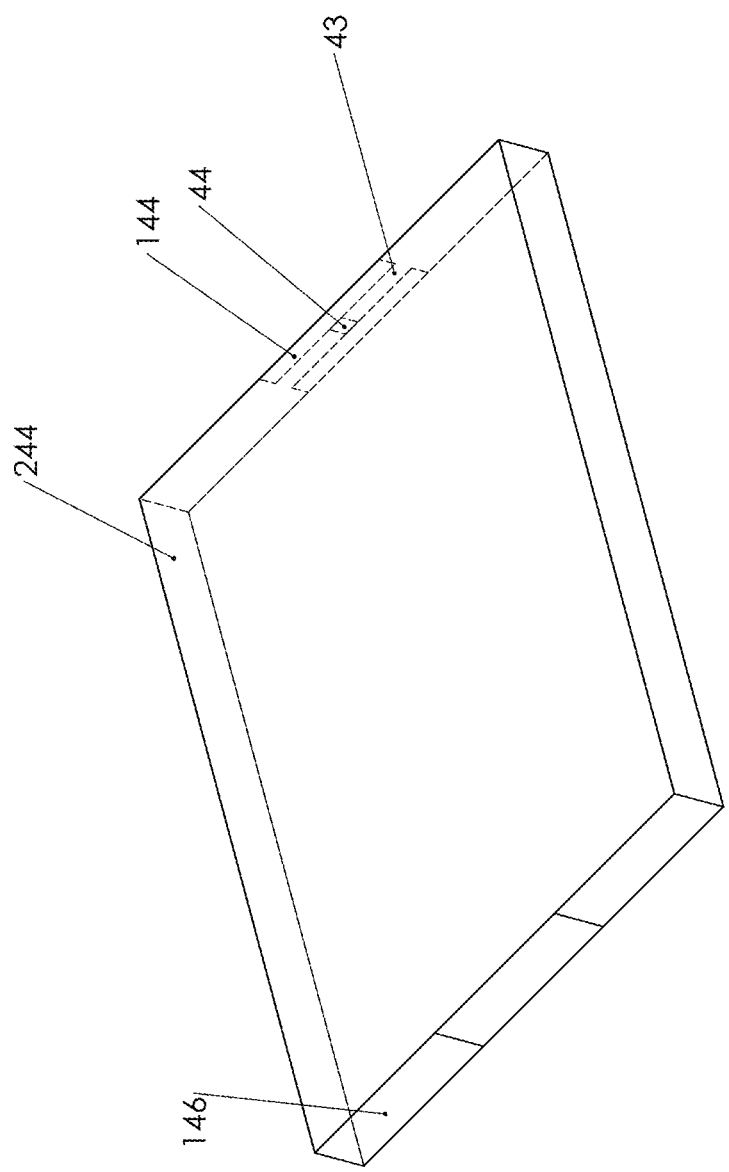
FIG. 23 shows a RF tag according to another embodiment of the present patent application.

FIG. 23 shows a RF tag according to another embodiment of the present patent application. In this embodiment, the RF device 44 is electrically connected to the conducting base portion 144. There is a slit 43 on the conducting base portion. In another view, if the conducting base portion 144 is considered as the first conducting layer instead, in this embodiment, the longest dimensions of the first conducting layer 144 and the second conducting layer 146 are smaller than the longest dimensions of the conducting base portions 244.

It should be noted that throughout the specification and claims herein, when one element is said to be "coupled" to another, this does not necessarily mean that one element is fastened, secured, or otherwise attached to another element. Instead, the term "coupled" means that one element is either connected directly or indirectly to another element, or is in electrical communication with another element.

While the present patent application has been shown and described with particular references to a number of embodiments thereof, it should be noted that various other changes or modifications may be made without departing from the scope of the present invention.

What is claimed is:

1. A RF tag comprising a resonant circuit structure and a RF device, the resonant circuit structure comprising:
   a first conducting layer;
   a second conducting layer spaced apart from the first conducting layer; and
   two conducting base portions respectively connecting two ends of the first conducting layers and two ends of the second conducting layers;
   wherein: a slit is formed on the first conducting layer and the RF device is electrically coupled to the first conducting layer and disposed over the slit; and
   at least an additional slit is formed on the first conducting layer and configured for transmitting electromagnetic waves with a polarization different from the electromagnetic waves transmitted through the other slit.

2. The RF tag of claim 1, wherein the first conducting layer is parallel with the second conducting layer.

3. The RF tag of claim 1 further comprising a layer of dielectric material disposed between the first conducting layer and the second conducting layer.

4. The RF tag of claim 1, wherein the RF device comprises a UHF RFID chip.

5. The RF tag of claim 4, wherein the UHF RFID chip comprises two signal outputs.

6. The RF tag of claim 1, wherein the RF device is directly electrically connected with the first conducting layer.

7. The RF tag of claim 1 further comprising at least an additional RF device, wherein the at least one addition RF device is disposed over the at least one additional slit.

8. The RF tag of claim 1 further comprising an internal conducting layer disposed between the first conducting layer and the second conducting layer.

9. The RF tag of claim 8, wherein the internal conducting layer is electrically connected with the second conducting layer by a plurality of conducting portions.

10. The RF tag of claim 9, wherein a slit is formed on the internal conducting layer.

11. The RF tag of claim 8 further comprising more than one internal conducting layer disposed between the first conducting layer and the second conducting layer.

12. The RF tag of claim 1, wherein the two conducting base portions are parallel with each other.

13. The RF tag of claim 12, wherein the slit is parallel with the conducting base portions.

14. The RF tag of claim 1 further comprising a discrete component connected to the first conducting layer, wherein the discrete component is a capacitor or an inductor.

15. The RF tag of claim 1 further comprising a metallic housing, wherein the metallic housing comprises a plurality of protuberances and the protuberances are aligned at a direction different from the RF tag's polarization direction.

16. The RF tag of claim 1, wherein an intrinsic inductor or an intrinsic capacitor is formed on the first conducting layer.

17. The RF tag of claim 1, wherein the longest dimensions of the first conducting layer and the second conducting layer are smaller than the longest dimensions of the conducting base portions.

18. The RF tag of claim 1, wherein the first conducting layer is divided by the slit into at least two islands spaced apart from each other.

19. The RF tag of claim 1 further comprising a layer of magnetic material disposed between the first conducting layer and the second conducting layer.

20. A resonant circuit structure for transmitting electromagnetic waves to a RF device, the resonant circuit structure comprising:

a first conducting layer;

a second conducting layer spaced apart from the first conducting layer; and two conducting base portions respectively connecting two ends of the first conducting layers and two ends of the second conducting layers;

wherein: a slit is formed on the first conducting layer and configured to support the RF device;

the first conducting layer is configured to electrically couple the RF device; and at least an additional slit is formed on the first conducting layer and configured for transmitting electromagnetic waves with a polarization different from the electromagnetic waves transmitted through the other slit.

* * * * *